(12) United States Patent
Adachi et al.

(10) Patent No.: US 8,102,751 B2
(45) Date of Patent: Jan. 24, 2012

(54) OPTICAL RECORDING CONDITION SETTING METHOD, OPTICAL RECORDING/REPRODUCING DEVICE, CONTROL PROGRAM, AND RECORDING MEDIUM

(75) Inventors: Yoshihisa Adachi, Osaka (JP); Shigemi Maeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/902,446

(22) Filed: Oct. 12, 2010

(65) Prior Publication Data

US 2011/0075538 A1    Mar. 31, 2011

Related U.S. Application Data

(62) Division of application No. 11/046,465, filed on Jan. 27, 2005, now Pat. No. 7,835,254.

(30) Foreign Application Priority Data

Jan. 30, 2004  (JP) ................................. 2004-024733

(51) Int. Cl.
*G11B 7/00* (2006.01)
(52) U.S. Cl. ................... 369/116; 369/53.26; 369/47.53
(58) Field of Classification Search .................. None
See application file for complete search history.

(56) References Cited

U.S. PATENT DOCUMENTS

| | | | |
|---|---|---|---|
| 5,936,924 A | 8/1999 | Tanaka | |
| 6,101,159 A | 8/2000 | Shoji et al. | |
| 6,157,609 A | 12/2000 | Shoji et al. | |
| 6,175,541 B1 | 1/2001 | Shoji et al. | |
| 6,178,148 B1 | 1/2001 | Shoji et al. | |
| 6,181,654 B1 | 1/2001 | Shoji et al. | |
| 6,188,656 B1 | 2/2001 | Shoji et al. | |
| 6,212,142 B1 | 4/2001 | Shoji et al. | |
| 6,233,211 B1 | 5/2001 | Shoji et al. | |
| 6,236,635 B1 | 5/2001 | Miyamoto et al. | |
| 6,349,081 B1 | 2/2002 | Shoji et al. | |
| 6,359,846 B1 | 3/2002 | Shoji et al. | |
| 6,611,481 B1 | 8/2003 | Koishi et al. | |
| 7,095,691 B2 | 8/2006 | Takeda | |
| 7,095,696 B2 | 8/2006 | Nakajima et al. | |
| 7,295,500 B2 | 11/2007 | Nakano et al. | |
| 7,940,623 B1 | 5/2011 | Dekker et al. | |
| 2001/0005343 A1 | 6/2001 | Shoji et al. | |
| 2001/0043538 A1 | 11/2001 | Miyamoto et al. | |
| 2002/0054556 A1 | 5/2002 | Miyamoto et al. | |
| 2003/0031108 A1 | 2/2003 | Furumiya et al. | |
| 2003/0039192 A1 | 2/2003 | Miyamoto et al. | |
| 2003/0043714 A1 | 3/2003 | Takeda | |

(Continued)

FOREIGN PATENT DOCUMENTS

JP    62-8371    1/1987

(Continued)

*Primary Examiner* — Lixi C Simpson
(74) *Attorney, Agent, or Firm* — David G. Conlin; Steven M. Jensen; Edwards Wildman Palmer LLP

(57) ABSTRACT

In order to provide an optical recording condition setting method which reduces effects from uneven properties of a rewritable or recordable optical disk and an optical recording/reproducing device, and to provide an optical recording/reproducing device which executes the method, (i) a test writing is carried out with respect to an optical disk under various settings of recording-power parameters for use in forming a shortest record-mark (S1 to S3), (iii) a test pattern used in the test writing is reproduced (S4), and then (iv) recording-power parameters that result in a good quality of reproduced signals are selected (S5).

19 Claims, 12 Drawing Sheets

U.S. PATENT DOCUMENTS

| | | |
|---|---|---|
| 2004/0017752 A1 | 1/2004 | Furumiya et al. |
| 2004/0081052 A1 | 4/2004 | Miyamoto et al. |
| 2004/0160874 A1 | 8/2004 | Hwang et al. |
| 2005/0030863 A1 | 2/2005 | Masui |
| 2005/0063274 A1 | 3/2005 | Nagano et al. |
| 2005/0088943 A1 | 4/2005 | Miyamoto et al. |
| 2005/0099924 A1 | 5/2005 | Dekker et al. |
| 2005/0180286 A1 | 8/2005 | Shoji et al. |
| 2005/0185558 A1 | 8/2005 | Shoji et al. |
| 2005/0201241 A1 | 9/2005 | Shoji et al. |
| 2005/0237890 A1 | 10/2005 | Miyamoto et al. |
| 2005/0259555 A1 | 11/2005 | Miyamoto et al. |
| 2008/0192617 A1 | 8/2008 | Miyamoto et al. |
| 2008/0212454 A1 | 9/2008 | Miyamoto et al. |
| 2008/0310264 A1 | 12/2008 | Miyamoto et al. |
| 2008/0310270 A1 | 12/2008 | Miyamoto et al. |
| 2009/0034393 A1 | 2/2009 | Miyamoto et al. |
| 2009/0040901 A1 | 2/2009 | Miyamoto et al. |
| 2011/0128837 A1 | 6/2011 | Dekker et al. |

FOREIGN PATENT DOCUMENTS

| | | |
|---|---|---|
| JP | 10-188316 | 7/1998 |
| JP | 11-086291 | 3/1999 |
| JP | 2000-030254 | 1/2000 |
| JP | 2000-200418 | 7/2000 |
| JP | 2001-351239 | 12/2001 |
| JP | 2003-505808 | 2/2003 |
| JP | 2003-67928 | 3/2003 |
| JP | 2003-208716 | 7/2003 |
| JP | 2004-213865 | 7/2004 |
| WO | 01/06500 | 1/2001 |
| WO | 02/084653 | 10/2002 |

CHANGE IN dTe FOR FORMING 2T-MARK [ns]

CHANGE IN Ttop FOR FORMING 2T-MARK [ns]

OPTICAL RECORDING CONDITION SETTING METHOD, OPTICAL RECORDING/REPRODUCING DEVICE, CONTROL PROGRAM, AND RECORDING MEDIUM

This Nonprovisional application is a divisional of application U.S. Ser. No. 11/046,465 filed on Jan. 27, 2005 now U.S. Pat. No. 7,835,254, which claims priority under 35 U.S.C. §119(a) to Japanese Patent Application No. 2004-024733 filed in Japan on Jan. 30, 2004, the entire contents of which are hereby incorporated by reference.

FIELD OF THE INVENTION

The present invention relates to optical recording condition setting method and a control program therefor, in which (I) recording conditions are set by (i) reading out setting information for determining recording conditions stored in a specific region of the optical medium such as an optical disk, or (ii) outputting the setting information from inside of a device, and (II) the recording conditions are corrected by recording and reproducing under the recording conditions in a specific region for use in determining the recording conditions. The present invention also relates to an optical recording/reproducing device and a recording medium each of which storing therein the control program.

BACKGROUND OF THE INVENTION

Mass storage optical disc systems, such as rewritable or recordable DVDs, have been developed and available on the market. The DVD-RAM, DVD-RW, and DVD-R are examples of the rewritable or recordable DVDs. In the optical disk system, a pulse train which varies in accordance with information to be recorded is converted into a pulse train which is smaller than a smallest unit of the information. Then, a strength of a laser beam is subjected to intensity modulation in accordance with the smaller pulse train, and the laser beam whose strength is modulated is focused onto a medium. The laser beam heats up the medium so as to cause properties of the medium to change. As a result, the information is recorded on the medium. Here, in the optical disk, recording condition setting information is recorded beforehand as standard recording conditions. This recording condition setting information is for compensating pulse width and strength of the laser beam needed for the recording.

Incidentally, with the increasing storage density of the optical disk, it becomes more necessary that the standard recording conditions be delicately set for each combination of a record-mark and a space, or for each record-mark length.

However, due to changes in environment and uneven properties of parts being used, properties of each of mass-produced optical disk recording/reproducing devices are not always the same. Similarly, properties of the respective optical disks being mass-produced may be uneven. This may cause uneven formation of the record-mark on the respective optical disks even if the record-mark is formed under uniform recording conditions. Accordingly, some combinations of the mass-produced optical disk and the mass-produced optical disk recording/reproducing device being used as they are may not carry out appropriate recording, and may result in defective quality, even in a case where properties of the optical disk are standard, and the standard recording conditions are set by using the optical disk recording/reproducing device having the standard properties.

In order to solve the foregoing problem, Japanese Unexamined Patent Application No. 200418/2000 (Tokukai 2000-200418; published on Jul. 18, 2000) discloses a method in which recording-pulse conditions are determined by modifying standard recording-pulse conditions. In the method, the standard recording-pulse conditions are corrected by causing a predetermined amount of change in (i) positional information of all of the combinations of a space length and the record-mark length, or (ii) the positional information of one of the combinations, the each piece of the positional information in the standard recording-pulse conditions being stored beforehand in the optical disk, so that values of the recording-pulse conditions causes a jitter value to not exceed a tolerance. These values obtained by correcting the standard recording-pulse conditions are set as the recording-pulse conditions.

Incidentally, in one of techniques in the foregoing optical recording condition setting method, (i) the positional information of all of the combinations of the space length and the record-mark length, or (ii) the positional information of one of the combinations is changed by the predetermined amount.

However, in a case where properties for forming the record-mark are different depending on the record-mark length, a predetermined change uniformly added may not result in appropriate formations of the record-marks of the respective record-mark lengths.

Further, in another technique in the method disclosed in the foregoing Tokukai, the predetermined change is added to one of combinations of the space lengths and the record-mark lengths. However, only some of the record-marks having the same record-mark length are improved. This resulted in an insufficient improvement in the quality of the reproduced signals reproduced from the overall spaces and the record marks.

Further, only a parameter (recording-pulse parameter) for pulse width is optimized, and a parameter (recording-power parameter) for recording power included in the recording conditions is not optimized.

SUMMARY OF THE INVENTION

In view of the foregoing problems, the present invention is made, and an object of the present invention is to provide (i) an optical recording conditions setting method and a control program therefor, in which effects from uneven properties of a rewritable or recordable optical disk and an optical recording/reproducing device are reduced, and (ii) a recording medium recording the program and an optical recording/reproducing device which executes the method.

In order to solve the foregoing problems, a method for setting optical recording conditions in an optical recording/reproducing device, in which (i) information is recorded by modulating light in accordance with conditions adjusted for the information to be recorded and (ii) the information recorded is reproduced, the method comprising the step of (I) determining a shortest-mark-recording-power parameter for use in forming a shortest record-mark, for obtaining a good quality of a reproduced signal, by (a) carrying out a test writing of a test pattern with respect to an optical recording medium under various settings of the shortest-mark-recording-power parameter, and (b) reproducing the test pattern recorded in the test writing.

Further, in order to solve the foregoing problems, an optical recording/reproducing device in which (i) information is recorded by modulating light in accordance with conditions adjusted for the information to be recorded and (ii) the information recorded is reproduced, the optical recording/reproducing device including (A) first test writing means for carrying out a test writing with respect to an optical recording medium under various settings of shortest-mark-recording-power parameter for use in forming a shortest record-mark; (B) reproduced-signal-evaluating means for reproducing a test pattern recorded in the test writing, and for evaluating quality of the reproduced signal; (C) selecting means for selecting the shortest-mark-recording-power parameter under which a good quality of the reproduced signal is obtained.

It should be noted that the at least one recording-power parameter is a parameter related to a power, such as recording power, erasing power, bias power. The at least one recording-power parameter may be only one of these parameters, or a plurality of the parameters. Further, the shortest-mark-recording-power parameter is the parameter related to the power for forming the shortest record-mark.

In the foregoing invention, the shortest-mark-recording-power parameter for use in forming the shortest record-mark is varied, in order to determine the recording-power parameters for improving the quality of the reproduced signals.

More specifically, shorter the length of the record-mark is, less a number of the recording-power parameters to be varied becomes, as such, it becomes difficult to set the recording-power parameters that result in the good quality of the reproduced signals. Further, shorter the length of the record mark is, more frequently the record mark appears within a data set, therefore the record-mark having a shorter length has a larger influence to an overall quality of forming the record marks. This requires that recording-power parameter for use in forming the shorter record-mark be more delicately adjusted. Accordingly, the quality of the overall reproduced signals is most effectively improved by selecting the shortest-mark-recording-power parameter under which the good quality of the reproduced signal is obtained, the shortest-mark-recording-power parameter for use in forming the shortest record-mark.

As a result it is possible to provide (i) a method for setting the optical recording conditions, in which effects from uneven properties of a rewritable or recordable optical disk and an optical recording/reproducing device are reduced, and (ii) an optical recording/reproducing device which executes the method.

Additional objects, features, and strengths of the present invention will be made clear by the description below. Further, the advantages of the present invention will be evident from the following explanation in reference to the drawings.

DESCRIPTION OF THE EMBODIMENTS

Embodiment 1

The following describes an embodiment of the present invention, with reference to FIGS. 1 to 6.

Figure 1:
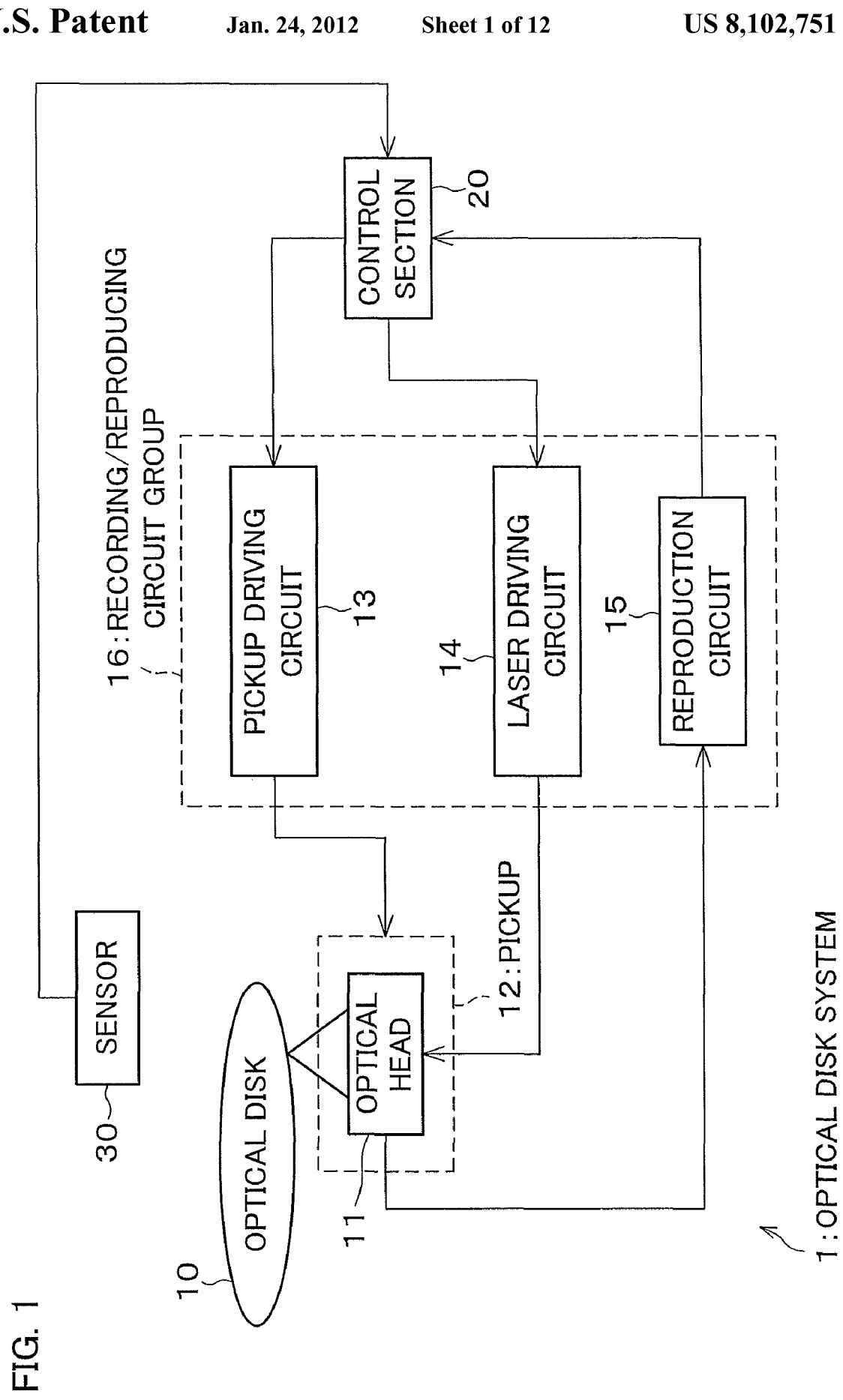
FIG. 1 illustrate an embodiment of a method in accordance with the present invention for setting optical recording pulse conditions in an optical disk system, and is a block diagram showing a configuration of the optical disk system.
Figure 2:
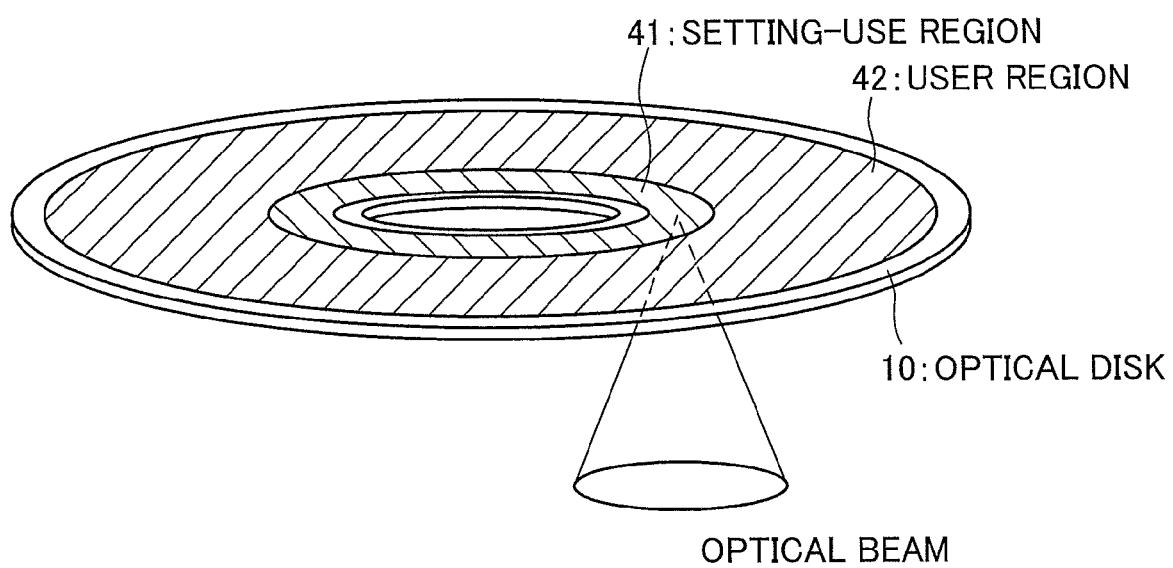
FIG. 2 is a perspective view illustrating an optical disk on which information is recorded by the optical disk system.

As shown in FIG. 1, in an optical disk system 1 serving as an optical recording/reproducing device to which an optical recording condition setting method of the present invention is adopted, a control section (reproduced-signal-evaluating means, recording-power determining means, recording-pulse determining means) 20 causes a pickup driving circuit 13 to move a pickup (reproduced-signal-evaluating means) 12 to a track (not shown) of a spinning optical disk 10.

The pickup 12 is provided with an optical head 11. The recording conditions are set by the control section 20 through a laser driving circuit (laser driver, first test writing means, second test writing means) 14. From the optical head 11, a laser beam for use in recording is irradiated to a record-site of the optical disk 10, so that information is recorded on the track of the optical disk 10.

Further, in the optical disk system 1, the control section 20 causes the pickup driving circuit 13 to move the pickup 12 to the record-site of the optical disk. Then, by using the laser driving circuit 14, the control section 20 causes the optical head 11 to irradiate a laser beam for use in reproduction to the optical disk 10.

A reflected beam sensed by the optical head 11 is converted into a reproduction signal by a reproduction circuit 15, and is inputted to the control section 20. Thus, the optical disk system 1 reproduces the information recorded on the track of the optical disk 10.

It should be noted that the reproduction means 15 of the optical disk system 1 of the present embodiment includes a comparator serving as selecting means. Further, it is possible to configure so that the control section 20 serves as the selecting means.

Here, the optical disk system 1 is specially provided with a sensor 30. The sensor 30 is for (i) sensing that the optical disk 10 is loaded, and/or (ii) sensing a change in a recording environment of the optical disk 10. This sensor 30 is, for example, a temperature sensor for sensing a temperature of the record-site of the optical disk 10. The sensor 30 then outputs a detection result as a sensor signal to the control section 20.

The control section 20 performs the setting of the recording conditions when the optical disk system 1 is loaded with the optical disk 10, as well as other occasions. For example, when a predetermined change in the recording environment is detected through the detection signal from the sensor 30, or when a predetermined time has elapsed since a test writing previously being carried out, the control section 20 performs the setting of the recording conditions as needed even while the information is being recorded.

The optical disk system 1 sets the recording conditions based on the test writing carried out with respect to a setting-use region 41 (See FIG. 2) of the optical disk 10. Then, the information is recorded on each track under the recording conditions. It should be noted that, after the recording conditions are set, the recording is carried out with respect to a user region 42, through a widely known operation. Further, in the setting-use region 41, standard recording conditions including recording-power parameters and recording-pulse parameters are recorded beforehand.

The optical disk system 1 reads out the standard recording conditions stored in the setting-use region 41, and uses the standard recording conditions for setting the recording conditions. Further, the standard recording conditions being read out may be stored in a memory (storing means) provided in the control section 20, and be used by reading out the standard recording conditions stored in the memory. Instead of reading out the standard recording conditions recorded in the setting-use region 41, the standard recording conditions may be stored beforehand in the storing means provided in the control section 20, and be used by reading out from the storing means. Note that a position of the setting-use region 41 is not limited to a position shown in FIG. 2, so that the setting-use region 41 may be provided in an arbitrary radial position of the optical disk 10. Further, the setting-use regions 41 may be provided in plural positions of the optical disk 10.

Next, a detail of the optical recording condition setting method of the present embodiment is described with reference to FIG. 3 to FIG. 6. Note that the following description deals with a case where a (1, 7) RLL (Run Length Limited) code is used in a modulation method. However, the present invention is not limited to the modulation method using the (1, 7) RLL code. Note further that the (1, 7) RLL code is a code in which a minimum and a maximum inverting intervals are limited, and is used in magnetic and optical digital recording. Further, in the modulation method using the (1, 7) RLL code, a shortest record-mark in a pulse train of the record-pulse is made up of a leading section and a trailing section (the detail is described later). On the contrary, a record-mark having a length longer than the shortest record-mark has an intermediate section provided accordingly to the record-mark length between the leading and trailing sections thereof. Note that there are some other modulation methods in which the shortest record-mark length is 3T or the like (e.g. DVD-RW, etc.). In this case, the shortest record-mark length includes the leading section, an intermediate section, and the trailing section. Further, there is a case where the shortest record-mark only includes the leading section, even though the shortest record-mark length is 2T (e.g. DVD-R, etc.).

Figure 3:
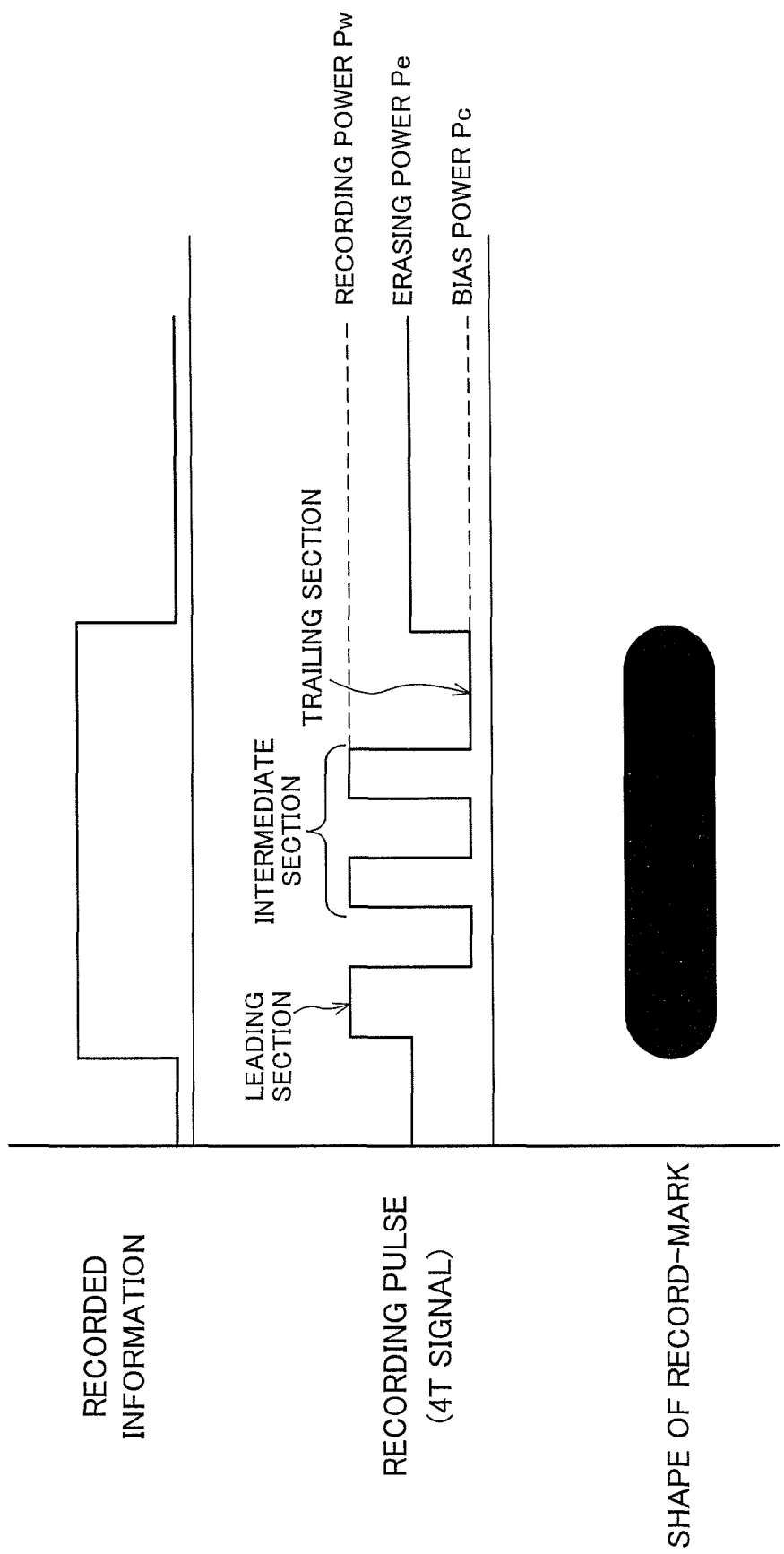
FIG. 3 is a timing chart showing a setting of a pulse train corresponding to the information.

As shown in FIG. 3, the pulse train corresponding with the information to be recorded is suitably set in consideration of a temperature distribution of the optical disk 10 for use in recording. Note that FIG. 3 shows the pulse train for forming a 4T-mark.

As described, the pulse train includes the leading section and the trailing section. In a case where the record-mark is 3T or longer, the pulse train further includes the intermediate section. Here, T represents a time corresponding one clock cycle. Therefore, for example, the 4T-mark means that a mark, i.e. record-site, where four 1s are recorded in four clock cycles.

Figure 4:
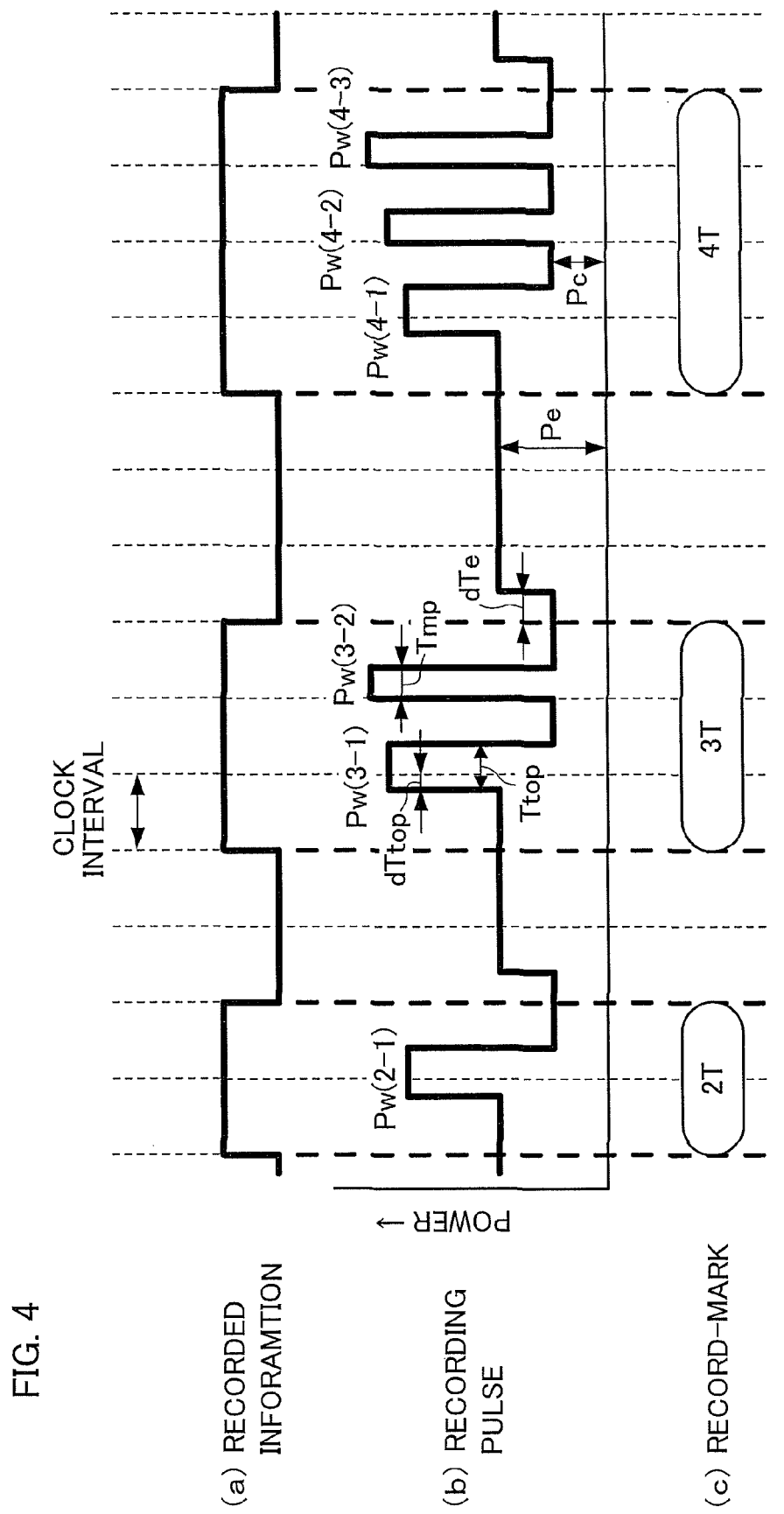
FIG. 4 is a timing chart showing pulse trains for forming various recording-marks and parameters for use in setting the recording pulse conditions.

Further, as shown in FIG. 4, the pulse train includes parameters of recording power (Pw), erasing power (Pe), and bias power (Pc). These parameters are referred to as recording-power parameters. Note that, in FIG. 4, the leading sections and the intermediate sections of the pulse train respectively have the uniform recording-power parameters, however the recording-power parameters may be different in each of the pulses.

Next, (a) to (c) in FIG. 4 show the pulse trains and recording-pulse parameters for forming the 2T-mark to the 4T-mark. More specifically, as shown in FIG. 4, dTop Ttop, dTe and Tmp are recording-pulse parameters. The dTtop indicates a starting point of a pulse at the leading section, the Ttop indicates a pulse width of the pulse at the leading section, the dTe indicates an ending point of a pulse at the trailing section, and the Tmp indicates a pulse width of the intermediate section. In accordance with changes in these parameters, a shape of the record-mark is changed. Standard values of these parameters are provided beforehand in the standard recording conditions, and are stored in the setting-use region 41 of the optical disk 10.

It should be noted that the recording-power parameters are set for each length of the record-mark, and each of the settings are independent from each other. In other words, the setting of the recording-pulse parameters (leading and trailing sections) for forming the shortest record-mark is not applied to the leading and trailing sections of the other record-marks. Further, as shown in FIG. 4, there are recording-power parameters for each of the record-mark lengths. Namely, a parameter PW (2-1) of shortest-mark-recording-power parameters are for forming a 2T-mark, parameters Pw (3-1) and Pw (3-2) of the recording-power parameters are for forming a 3T-mark, and parameters Pw (4-1), Pw (4-2), and Pw (4-3) of the recording-power parameters are for forming the 4T-mark, and so forth.

The following describes relationships between the respective parameters and the record-mark formation.

First, an increase in the starting point dTop of the pulse at the leading section causes a starting point of the record-mark to move forward. On the contrary, a decrease in the dTop causes the starting point of the record-mark to move backward.

An increase in the pulse width Ttop of the pulse at the leading section causes a size of a head section of the record-mark to increase in a radial direction of the optical disk 10. On the contrary, a decrease in the Ttop causes the size of the head section in the record-mark to decrease in the radial direction of the optical disk 10. Further, an increase in the recording-power parameters assigned to the leading section of the pulse (i.e. the parameter Pw (2-1) for the 2T-mark, the Pw (3-1) for the 3T-mark, and the Pw (4-1) for the 4T-mark) causes the size of the head section of the record-mark to increase in a track direction, and a decrease in the recording-power parameters assigned to the leading section of the pulse causes the size of the head section of the record-mark to decrease in the track direction.

Further, an increase in the ending point dTe of the pulse causes an ending point of the record-mark to move backward. On the contrary, a decrease in the dTe causes the ending point of the record-mark to move forward.

Further, an increase in the pulse width Tmp of the intermediate section causes the size of the record-mark increases in the radial direction. On the contrary, a decrease in the Tmp causes the size of the record-mark to decrease in the radial direction. Further, an increase in the recording-power parameter assigned to the intermediate section of the pulse (i.e. the parameter Pw (3-2) for the 3T-mark, and the Pw (4-2) and the Pw (4-3) for the 4T-mark) causes the size of the record mark to increase in the radial direction. On the contrary, a decrease in the recording-power parameter assigned to the intermediate section of the pulse causes the size of the record mark to decrease in the radial direction.

Figure 5:
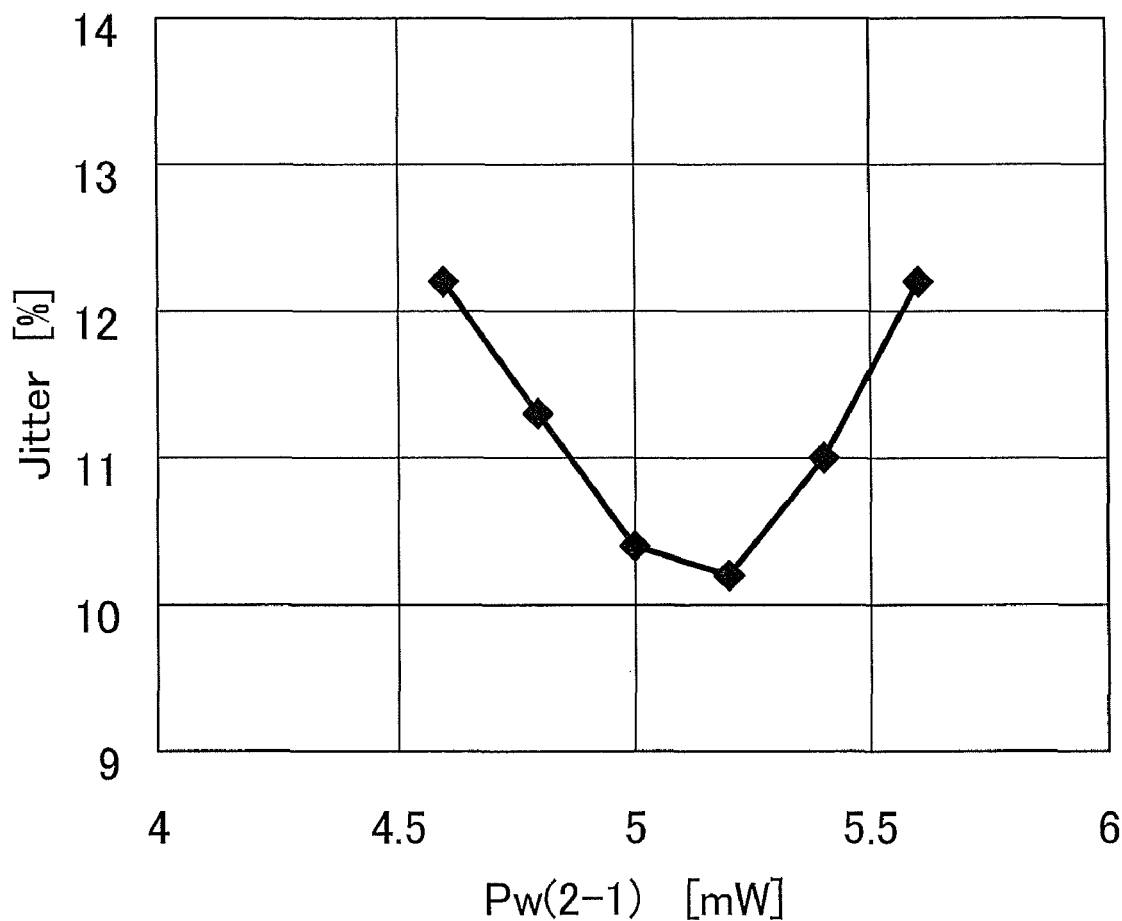
FIG. 5 is a graph indicating a result of jitter measurement in the method for setting the optical recording conditions.

Next, a measurement was carried out with respect to jitter value in the test writing of a test pattern including the 2T-mark to an 8T-mark. Only the Pw (2-1) of the recording-power parameters for use in forming the 2T-mark was varied while the test writing was carried out, and resulting jitter values measured are indicated in FIG. 5. The jitter value indicates a quality of reproduced signals. Note that the jitter is a disorder taking place in amplitude, pulse width, pulse position, repeated frequency, or in pulse interval in the pulse train. Based on a result of the measurement, conditions causing a minimum jitter value were selected, and were set as recording-power parameters for the 2T-mark.

Figure 6:
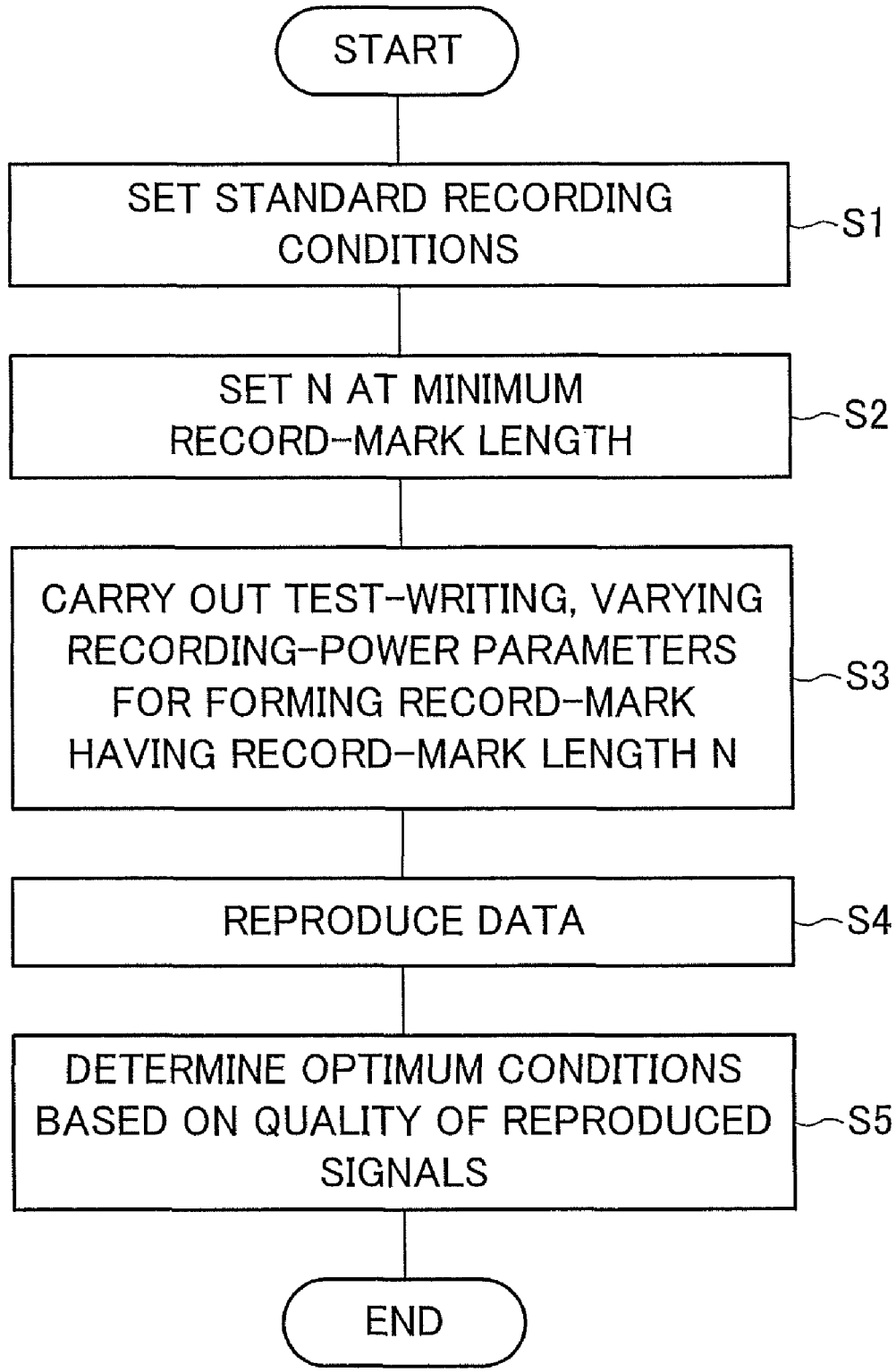
FIG. 6 is a flow-chart indicating the method for setting the optical recording conditions.

Next described are specific steps of setting the recording conditions in the optical disk system 1, with reference to a flow-chart shown in FIG. 6.

First, the control section 20 causes the optical disk system 1 to read out the standard recording conditions from the optical disk 10, thereby setting the standard recording conditions (S1). Then, N indicating the record-mark length is set to a value of the shortest record-mark (S2). Here, in the case where the (1, 7) RLL code is used in the modulation method, a value of N is set at 2.

Next, the test writing of the test pattern is carried out with respect to the setting-use region 41, while the shortest-mark-recording-power parameters for use in forming the 2T-mark is varied (S3). Then, the test pattern recorded is reproduced (S4). Then, based on the quality of the reproduced signals reproduced in the step S4, among the recording-pulse conditions of the test writing, those resulted in a best quality of the reproduced signals are selected as the shortest-mark-recording-power parameters (S5).

It should be noted that the quality of the reproduced signals is also indicated by using an error rate, instead of the jitter value.

The both error rate and the jitter value are often used for indicating power margin regulation for the optical disk 10, and it is possible to grasp the quality of the recording by confirming whether or not the error rate or the jitter value is within the power margin regulation.

Incidentally, in a case where properties for forming the record mark under certain recording conditions are different depending on the record-mark length, uniformly adding a predetermined change may not result in appropriate formations of the record-marks of the respective record-mark lengths.

However, in the present embodiment, the shortest-mark-recording-power parameters for use in forming the shortest record-mark are varied, in order to determine which recording-power parameters improves the quality of the reproduced signals.

More specifically, shorter the length of the record-mark is, less a number of the recording-power parameters to be varied becomes, as such, it becomes difficult to adjust the recording-power parameters for forming the record-mark from which the best quality of the reproduced signals is obtained. Further, shorter the length of the record mark is, more frequently is the record mark used within a data set; therefore the record-mark of the shorter length has a larger influence to an overall quality of the record marks. This requires that the recording-power parameters for use in forming the shorter record-mark be more delicately adjusted. Accordingly, a better setting of the shortest-mark-recording-power parameters for use in forming the shortest record-mark most effectively improves the quality of the overall reproduced signals.

Thus, by selecting such setting of the shortest-record-mark-recording-power parameters that the quality of the reproduced signals becomes better, it is possible to reduce effects of the uneven properties of the rewritable or recordable optical disk 10 and the optical disk system 1 to the overall quality of the reproduced signals.

Further, in a conventional method, to add a predetermined change to one of combinations of space lengths and the record-mark lengths, only some of the record-marks having a uniform length are improved. This resulted in an insufficient improvement in the quality of the reproduced signals reproduced from the overall spaces and the record marks. The present embodiment also solves this problem, by taking into account the quality of the reproduced signals reproduced from all of the record-marks.

Embodiment 2

Figure 7:
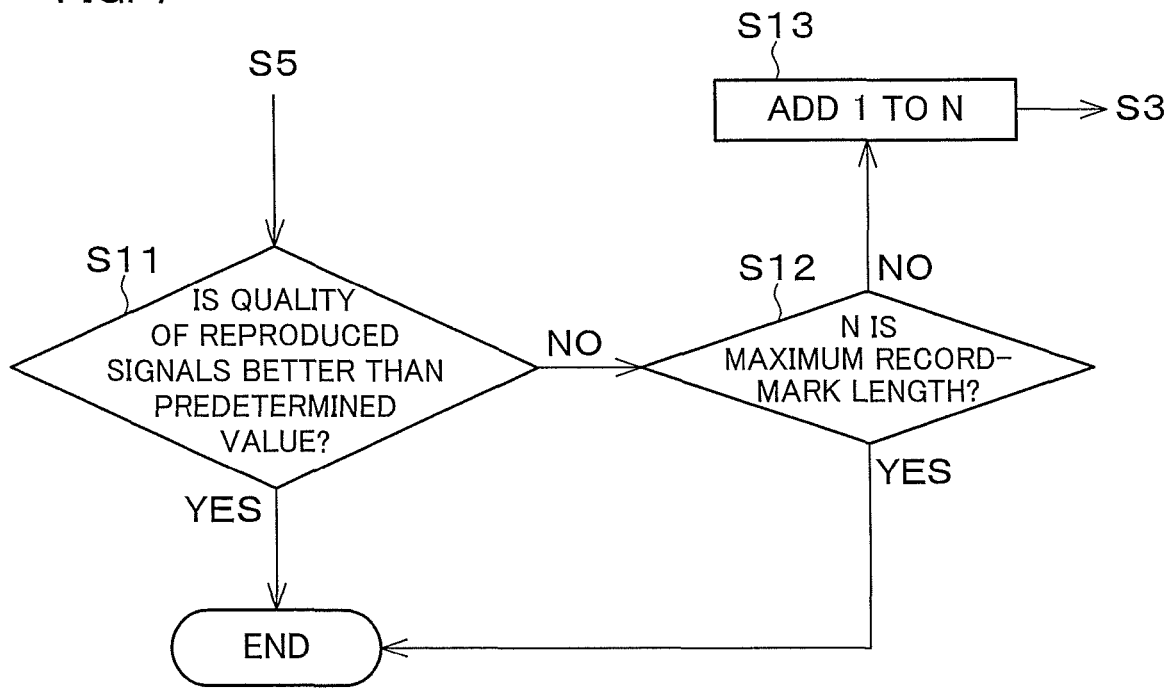
FIG. 7 is a flow-chart indicating another embodiment of the optical recording condition setting method in accordance with the present invention.

The following describes another embodiment in accordance with the present invention, with reference to FIG. 7. It should be noted that features of the present embodiment are the same as those of the foregoing embodiment 1, unless otherwise described hereinbelow. Accordingly, the same symbols are given to the members that have the same functions as those shown in Figures of the foregoing embodiment 1, and are the descriptions of those members omitted here as a matter of convenience.

In an optical recording condition setting method of the present embodiment, a number of writing pulse conditions to be set increases as a length of record-mark increases.

More specifically, as described, shorter the length of the record-mark is, less a number of recording-power parameters to be varied becomes, therefore it becomes more difficult to set the writing pulse conditions to realize a good quality of reproduced signals reproduced from the record-mark having a shorter length. Further, shorter the length of the record mark is, more frequently is the record mark used within a data set, therefore in the present embodiment, the setting of the recording-power parameters is carried out with respect to record-mark lengths from a shorter length to a longer length, thus efficiently realizing the power parameters that result in the good quality of the reproduced signals.

The following describes the optical recording condition setting method of the present embodiment executed in an optical disk system 1, with reference to a flow-chart shown in FIG. 7. It should be noted that the flow-chart is in succession of the step S5 described in the foregoing embodiment 1. The steps up to the step S5 are as described in the foregoing embodiment 1, and the descriptions of those the steps are omitted.

After the step S5 of the foregoing embodiment 1 is carried out, in the present embodiment, an evaluation is first carried out with respect to the quality of the reproduced signals reproduced from a test pattern recorded in a test writing (S11). In the step S11, if the quality of the reproduced signals is better than a predetermined quality of the reproduced signals, the setting of the recording-power parameters is ended. On the contrary, if the quality of the reproduced signals is not good enough, a length N of the record-mark, which is usually a whole number of 2 or more, is judged whether or not it is maximum (S12).

If the length N of the record-mark is judged as the maximum in the step S12, the setting of the recording conditions is ended. This is because the quality of the reproduced signals is not good, even if the setting of the recording conditions is carried out with respect to all of the record-mark lengths. After that, it is possible to carry out (i) another setting of the recording conditions by using a different track for use in test writing, or (ii) an error indication for notifying of a defect in a disk.

On the contrary, if the length N of the record-mark is judged as not the maximum in the step S12, the length N is set at N+1 (S13), and the process goes back to the step S3 of FIG. 6 described in the embodiment 1 are repeated.

Thus, it is possible to efficiently carry out the setting of the recording-power parameters for obtaining the good quality of the reproduced signals.

In the present embodiment as well as embodiments described after the present embodiment, the recording-power parameters for forming the shortest record-mark and other record-marks are referred to as the recording-power parameters.

It should be noted that, according to the foregoing description, the length of the record-mark is set at N+1 in the step S13. However, the present embodiment is not limited to this, and it is possible to carry out the step S13 in such a manner as to add a number greater than 1, such as 2, to the length N.

As described, in the optical recording condition setting method of the present invention, after the shortest-mark-recording-power parameters for forming the shortest record-mark are determined, a process is carried out, at least once, for determining the recording-power parameters, for obtaining the best quality of the reproduced signal. This process includes the steps of (i) carrying out the test writing of the test pattern with respect to the optical disk 10 under various settings of the recording-power parameters, in order of the length from a shorter length to a longer length; and (ii) reproducing the test pattern recorded in the test writing.

Accordingly, not only is it that the shortest-mark-recording-power parameters are determined for obtaining good quality reproduced signals reproduced from the shortest record-marks, but also that the other recording-power parameters are determined in order of length, for example, from 3T-mark, 4T-mark, and so on. This realizes the good quality of the reproduced signals reproduced from the other record-marks.

The foregoing description mentions that a process is carried out, at least once, for determining the recording-power parameters. It should be noted that this description means that, for example, in a case where 2T-mark to the 8T-mark are to be formed, the recording-power parameters for forming the 8T-mark may not be determined, and the process may end after determining the recording-power parameters for forming a 7T-mark. Further, recording-power parameters are from the shorter length to the longer length. However, it is not necessary to carry out the varying of recording-power parameters in order with respect to all of the record-mark lengths, as long as a record-mark to be varied next is longer than a record-mark that has been varied in the present time. For example, after the recording-power parameters for forming the 3T-mark are varied, the recording-power parameters for forming a 5T-mark are varied instead of varying the recording-power parameters for forming the 4T-mark.

As a result, with respect to all of the record-mark lengths, it is possible to (i) reduce effects from uneven properties of a rewritable or recordable optical disk and the optical disk system 1, (ii) more accurately optimize the recording pulse conditions, and (iii) more efficiently carry out the setting of recording-power parameters for obtaining the good quality of the reproduced signals.

It should be noted that the process of determining the recording-power parameters may include a process of determining the shortest-mark-recording-power parameters. In this case, the process of determining the shortest-mark-recording-power parameters may be carried out twice.

Embodiment 3

Figure 8:
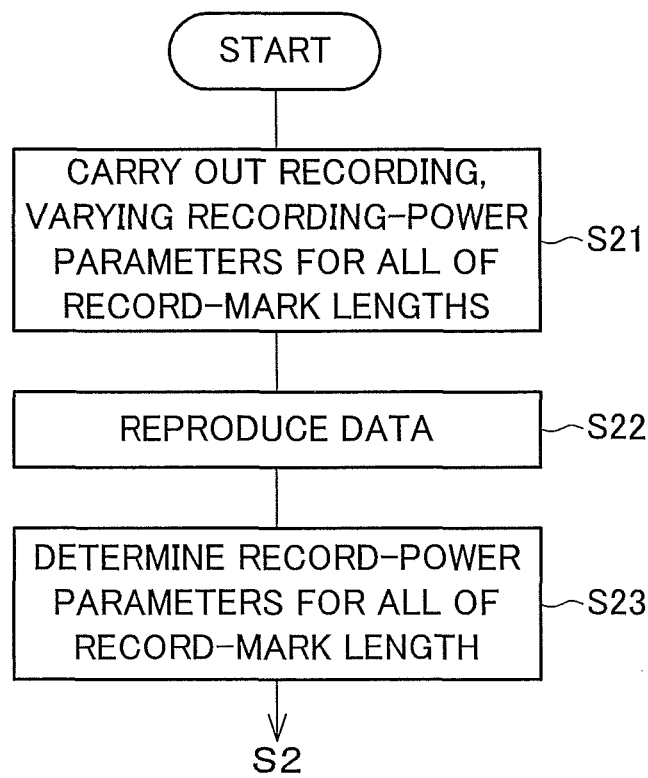
FIG. 8 is a flow-chart indicating yet another embodiment of the optical recording condition setting method in accordance with the present invention.

The following describes another embodiment in accordance with the present embodiment, with reference to FIG. 8. It should be noted that features of the present embodiment are the same as those of the foregoing embodiments 1 and 2, unless otherwise described hereinbelow. Accordingly, the same symbols are given to the members that have the same functions as those shown in Figures of the foregoing embodiments 1 and 2, and are the descriptions of those members omitted here as a matter of convenience.

In an optical recording condition setting method of the present invention, test writing is carried out so that recording-power parameters are appropriately set for each of record-mark lengths, prior to carrying out setting of the recording-power parameters with respect to each of the record-mark lengths. This allows more accurate setting of recording-power parameters.

Further, in the present embodiment, in order to determine the appropriate recording-power parameters for all of the record-mark lengths, the recording-power parameters for the respective record-mark lengths are uniformly varied while the test writing is carried out. It should be noted that the recording-power parameters may be uniformly varied by (i) multiplying at least one of the recording-power parameters, i.e. one of recording power, erasing power, and bias power (See FIG. 3) described in the foregoing embodiment 1, or (ii) adding or subtracting a predetermined power.

The following describes the optical recording condition setting method of the present embodiment which is executed in an optical disk system 1, with reference to a flow-chart shown in FIG. 8.

First, in the optical disk system 1, the recording-power parameters for all of the record-mark lengths are uniformly varied, while the test writing of a test pattern is carried out (S21). Then, the test pattern is reproduced (S22). Next, based on a result of detecting the reproduced signals obtained in S22, most appropriate recording-power parameters are selected from the recording-power parameters used in the test writing (S23). Then carried out are the step S2 (See FIG. 6) and the steps thereafter described in the foregoing embodiment 1.

Therefore, in the present embodiment, the recording-power parameters for all of the record-mark lengths are first determined, and then the recording-power parameters, under which a good quality of the reproduced signals is obtained, are selected for the respective record-mark lengths.

As a result, it is possible to optimize the recording-power parameters with respect to all of the record-mark lengths. Further, it is possible to select the recording-power parameters, under which the good quality of the reproduced signals is obtained, with the recording-power parameters being fixed.

It should be noted that the present embodiment deals with a case where the recording-power parameters for all of the record-mark lengths are uniformly varied, while the test writing is carried out. However, the present embodiment is not limited to this. It is possible to vary the recording-power parameters for an arbitrary record-mark length. Further, the recording-power parameters may be arbitrarily varied, instead of uniformly varying them.

Embodiment 4

Figure 9:
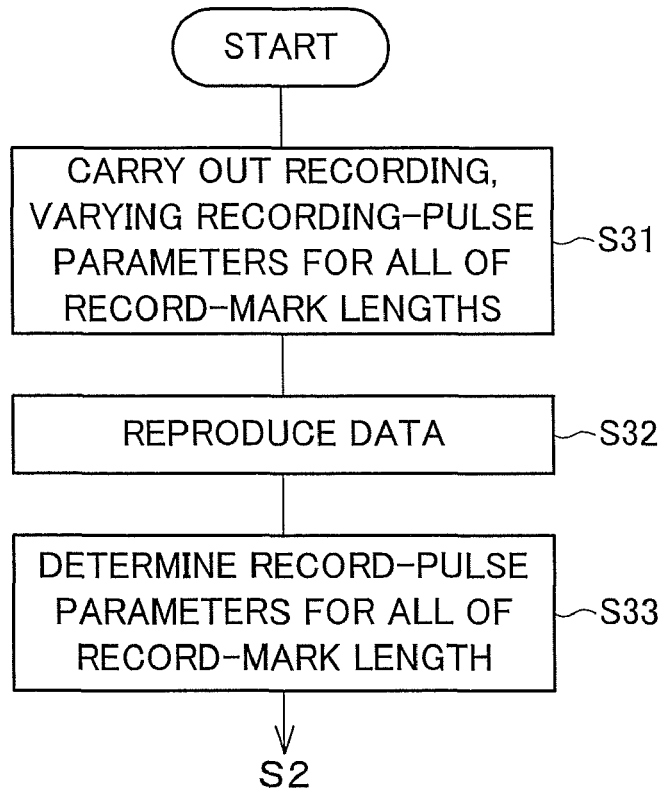
FIG. 9 is a flow-chart indicating still another embodiment of the optical recording condition setting method in accordance with the present invention.

The following describes another embodiment in accordance with the present invention, with reference to FIG. 9. It should be noted that features of the present embodiment are the same as those of the foregoing embodiments 1 through 3, unless otherwise described hereinbelow. Accordingly, the same symbols are given to the members that have the same functions as those shown in Figures of the foregoing embodiments 1 through 3, and are the descriptions of those members omitted here as a matter of convenience.

In a optical recording condition setting method of the present embodiment, test writing is carried out so that recording-pulse parameters are appropriately set for each of record-mark lengths, prior to setting the recording-power parameters with respect to each of the record-mark lengths. This allows more accurate setting of the recording-power parameters and the recording-pulse parameters.

Further, in the present embodiment, in order to determine appropriate recording-pulse parameters, the recording-pulse parameters for all of the record-mark lengths are uniformly varied while the test writing is carried out. It should be noted that the recording-pulse parameters may be uniformly varied by (i) multiplying at least one of the recording-pulse parameters, i.e. one of (a) dTop indicating a starting point of a leading section of a pulse train, (b) Ttop indicating a pulse width of the leading section, (c) dTe indicating an ending point of a trailing section of the pulse train, and (d) Tmp indicating the pulse width of an intermediate section of the pulse train (See FIG. 4) described in the foregoing embodiment 1, or (ii) adding or subtracting a predetermined amount of power.

The following describes the optical recording condition setting method of the present embodiment which is executed in an optical disk system 1, with reference to a flow-chart shown in FIG. 9.

First, in the optical disk system 1, the recording-pulse parameters for the respective record-mark lengths are uniformly varied, while the test writing of a test pattern is carried out (S31). Then, the test pattern is reproduced (S32). Next, based on a result of detecting the reproduced signals obtained in S32, most appropriate recording-pulse parameters are selected from the recording-pulse parameters used in the test writing (S33). Then carried out are the step S2 (See FIG. 6) and the steps thereafter described in the foregoing embodiment 1.

Therefore, in the present embodiment, the recording-power parameters for all of the record-mark lengths are first determined, and then the recording-power parameters, under which a good quality of the reproduced signals is obtained, are selected for the respective record-mark lengths.

As a result, it is possible to optimize the recording-pulse parameters with respect to all of the record-mark lengths. Further, it is possible to select the recording-power parameters, under which the good quality of the reproduced signals is obtained, with the recording-pulse parameters being fixed. Further, the selection needs to be carried out only once.

It should be noted that the present embodiment deals with a case where the recording-pulse parameters for all of the record-mark lengths are uniformly varied, while the test writing is carried out. However, the present embodiment is not limited to this. It is possible to vary the recording-pulse parameters for an arbitrary length of the record-mark. Further, the recording-pulse parameters may be arbitrarily varied, instead of uniformly varying them.

Embodiment 5

Figure 10:
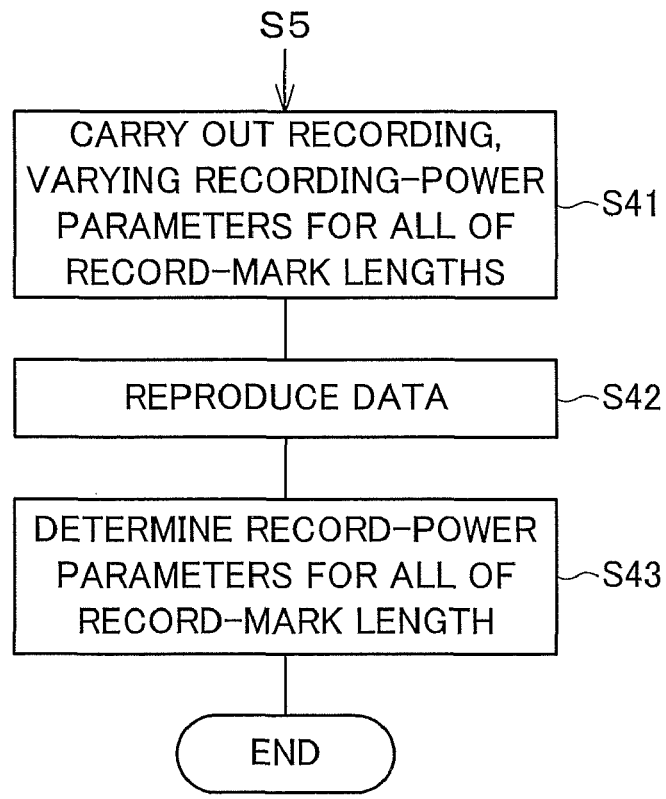
FIG. 10 is a flow-chart indicating further embodiment of the optical recording condition setting method in accordance with the present invention.

The following describes another embodiment in accordance with the present invention, with reference to FIG. 10. It should be noted that features of the present embodiment are the same as those of the foregoing embodiments 1 through 4, unless otherwise described hereinbelow. Accordingly, the same symbols are given to the members that have the same functions as those shown in Figures of the foregoing embodiments 1 through 4, and are the descriptions of those members omitted here as a matter of convenience.

In an optical recording condition setting method of the foregoing embodiment 3, recording-power parameters are determined for all of the record-mark lengths, and then the recording-power parameters are adjusted for each length of the record mark.

On the contrary, in an optical recording condition setting method of the present embodiment, recording-power parameters are determined for each of the record-mark lengths, prior to carrying out the test writing for more appropriately setting the recording-power parameters for all of the record-mark lengths. More specifically, the recording-power parameters are more appropriately determined by uniformly varying the recording-power parameters for the respective lengths of the record mark, while the test writing is carried out. This also allows more accurate setting of the recording-power parameters.

It should be noted that, in the present embodiment, in order to determine appropriate recording-power parameters for all of the record-mark lengths, the recording-power parameters for the respective record-mark lengths are uniformly varied while the test writing is carried out, as is the case with the foregoing embodiment 3. Further, similarly to the foregoing embodiment 3, the recording-power parameters may be uniformly varied by (i) multiplying at least one of the recording-power parameters, i.e. one of recording power, erasing power, and bias power (See FIG. 3) described in the foregoing embodiment 1, or (ii) adding or subtracting a predetermined power.

The following describes the optical recording condition setting method of the present embodiment which is executed in an optical disk system 1, with reference to a flow-chart shown in FIG. 10. It should be noted that the flow-chart is in succession of the step S5 described in the foregoing embodiment 1. The steps up to the step S5 are as described in the foregoing embodiment 1, and the descriptions of those the steps are omitted.

As shown in FIG. 10, in the optical disk system 1, the steps up to S5 (See FIG. 6) described in the foregoing embodiment 1 are carried out. Then, the test writing of a test pattern is carried out under various settings of the recording power parameters (S41). Next, the test pattern is reproduced (S42). Then, based on a result of detecting the reproduced signals obtained in S42, the most appropriate settings of the recording-power parameters are selected from the recording-power parameters used in the test writing (S43).

As described, more accurate setting of the recording conditions is realized by appropriately determining the recording-power parameters for all of the record-mark lengths through the test writing carried out after setting of the recording-power parameters for each of the record-mark lengths.

It should be noted that the present embodiment deals with a case where the recording-power parameters for all of the record-mark lengths are uniformly varied, while the test writing is carried out. However, the present embodiment is not limited to this. It is possible to vary the recording-power parameters for an arbitrary length of the record-mark. Further, the recording-power parameters may be arbitrarily varied, instead of uniformly varying them.

Embodiment 6

Figure 11:
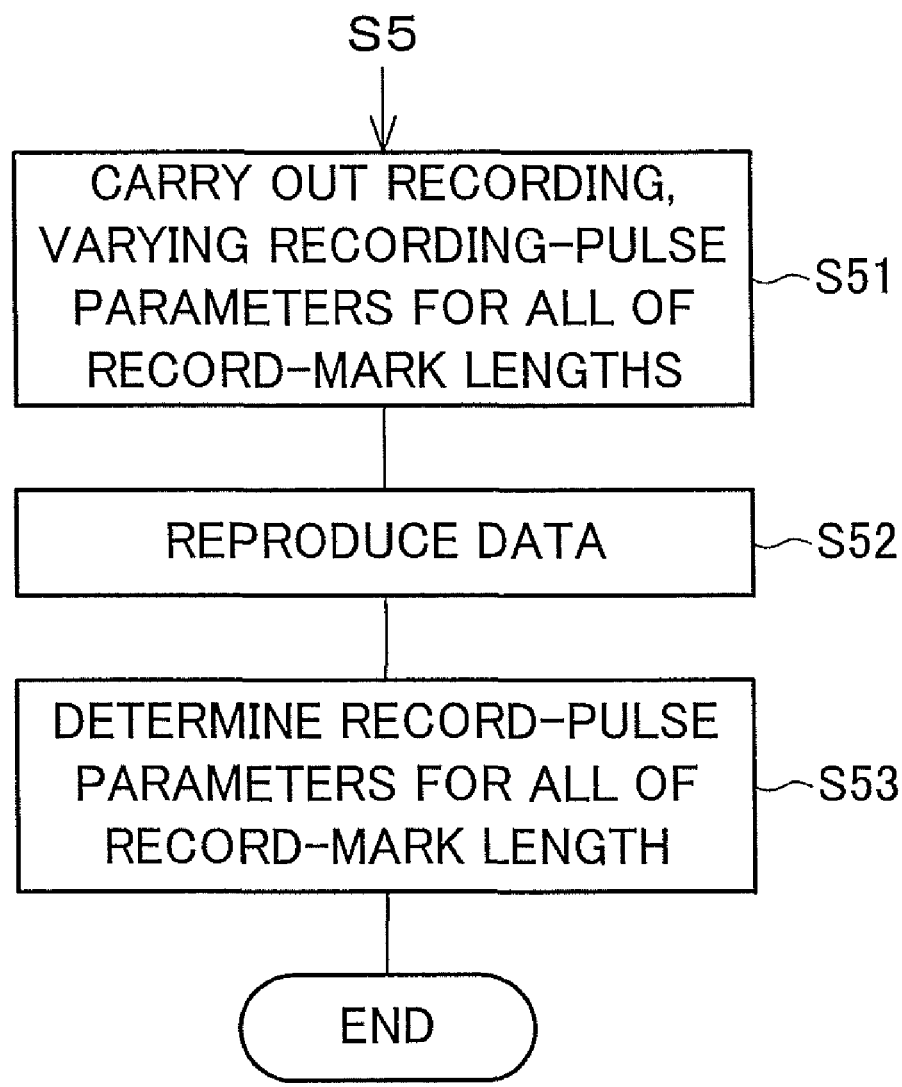
FIG. 11 is a flow-chart indicating yet still another embodiment of the optical recording condition setting method in accordance with the present invention.

The following describes another embodiment in accordance with the present invention, with reference to FIG. 11. It should be noted that features of the present embodiment are the same as those of the foregoing embodiments 1 through 5, unless otherwise described hereinbelow. Accordingly, the same symbols are given to the members that have the same functions as those shown in Figures of the foregoing embodiments 1 through 5, and are the descriptions of those members omitted here as a matter of convenience.

In an optical recording condition setting method of the foregoing embodiment 4, recording-pulse parameters are determined for all of the record-mark lengths, and then recording-power parameters are set for each of record-mark length.

On the contrary, in an optical recording condition setting method of the present embodiment, the recording-power parameters are determined, prior to the test writing for more appropriately setting of the recording-pulse parameters for all of the record-mark lengths. This also allows more accurate settings of the recording-power parameters and the recording-pulse parameters.

It should be noted that, in the present embodiment, in order to determine appropriate recording-pulse parameters for all of the record-mark lengths, the recording-pulse parameters for the respective record-mark lengths are uniformly varied while the test writing is carried out, as is the case with the foregoing embodiment 4. Further, the recording-pulse parameters may be uniformly varied by (i) multiplying at least one of the recording-pulse parameters, i.e. one of (a) dTop indicating a starting point of a leading section of a pulse train, (b) Ttop indicating a pulse width of the leading section, (c) dTe indicating an ending point of a trailing section of the pulse train, and (d) Tmp indicating the pulse width of an intermediate section of the pulse train (See FIG. 4) described in the foregoing embodiment 1, or (ii) adding or subtracting a predetermined power.

The following describes the optical recording condition setting method of the present embodiment which is executed in an optical disk system 1, with reference to a flow-chart shown in FIG. 11. It should be noted that the flow-chart is in succession of the step S5 described in the foregoing embodiment 1 (See FIG. 6). The steps up to the step S5 are as described in the foregoing embodiment 1, and the descriptions of those the steps are omitted.

As shown in FIG. 11, in the optical disk system 1, the steps up to S5 described in the foregoing embodiment 1 are carried out. Then, the test writing of a test pattern is carried out by varying the recording pulse parameters (S51). Next, the test pattern is reproduced (S52). Then, based on a result of detecting the reproduced signals obtained in S52, the most appropriate settings of the recording-pulse parameters are selected from the recording-pulse parameters used in the test writing (S53).

As described, more accurate setting of the recording conditions is realized by appropriately determining the recording-pulse parameters through the test writing, after the setting of the recording-power parameters.

It should be noted that the present embodiment deals with a case where the recording-pulse parameters for all of the record-mark lengths are uniformly varied, while the test writing is carried out. However, the present embodiment is not limited to this. It is possible to vary the recording-pulse parameters for an arbitrary length of the record-mark. Further, the recording-power parameters may be arbitrarily varied, instead of uniformly varying them.

Embodiment 7

The following describes another embodiment in accordance with the present invention, with reference to FIG. 12 through FIG. 16. It should be noted that features of the present embodiment are the same as those of the foregoing embodiments 1 through 6, unless otherwise described hereinbelow. Accordingly, the same symbols are given to the members that have the same functions as those shown in Figures of the foregoing embodiments 1 through 6, and are the descriptions of those members omitted here as a matter of convenience.

In the foregoing embodiment 4, the recording-pulse parameters are determined for all of the record-mark lengths, and then recording-power parameters are set for each of record-mark lengths.

In an optical recording condition setting method of the present embodiment, the recording-power parameters and the recording-pulse parameters are more accurately set by (i) carrying out the test writing by setting of the recording-power parameters, and (ii) varying the recording-pulse parameters corresponding to the recording-power parameters to be varied, based on a result obtained from the test writing.

First, in the present embodiment, the test writing is carried out by using a test pattern including 2T-mark to 8T-mark, and values of jitter were measured. A result of the measurement is shown in FIGS. 12 through 15.

Figure 12:
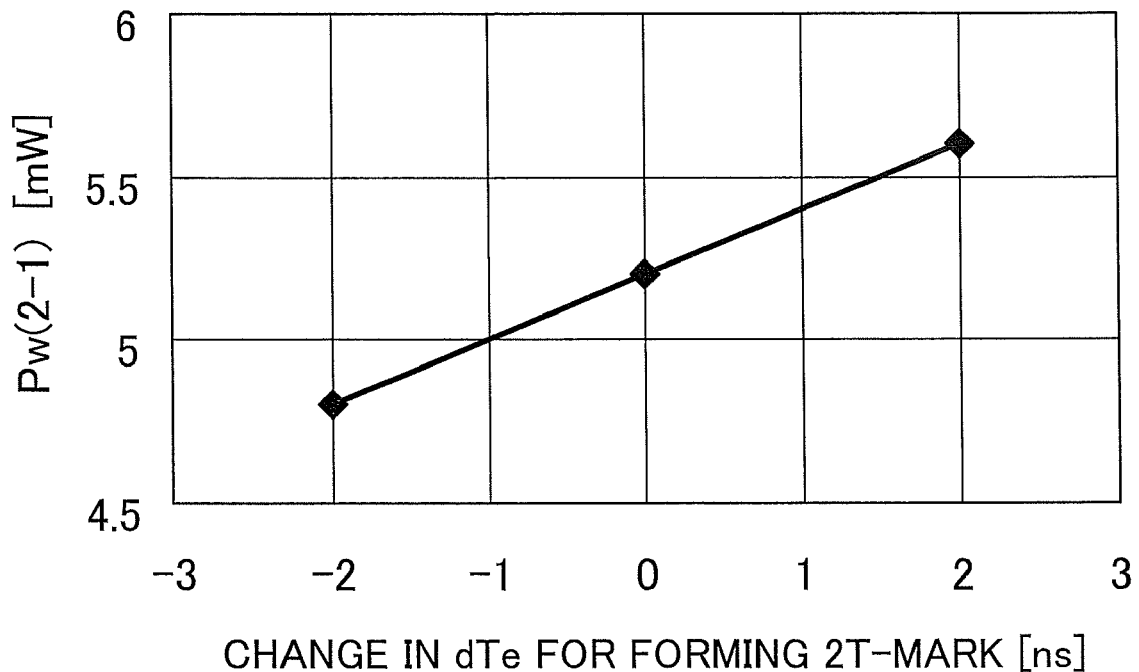
FIG. 12 is a graph indicating a result of jitter measurement in the optical recording condition setting method.

FIG. 12 is a graph indicating a change in a recording power under which a best quality of reproduced signal is obtained, in a case where an ending point dTe of a pulse at a trailing section of the 2T-mark is moved forward and backward, and only the Pw (2-1) of the recording-power parameters for forming the 2T-mark is varied. The Pw (2-1) of the 2T-mark, under which the best quality is obtained, increases as the ending point dTe of the 2T-mark moves forward, i.e. in a plus direction of the graph.

Figure 13:
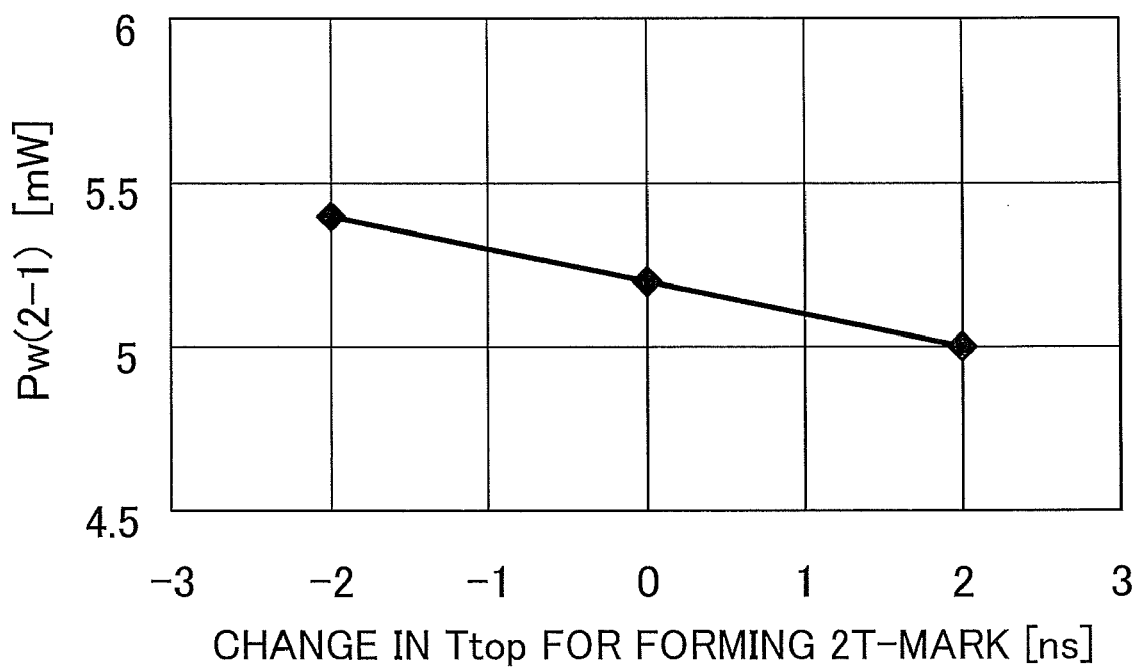
FIG. 13 is a graph indicating a result of jitter measurement in the optical recording condition setting method.

FIG. 13 is a graph indicating the change in the recording power under which the best quality of reproduced signal is obtained, in a case where a pulse width Ttop of a pulse at a leading section of the 2T-mark is changed, and only the Pw (2-1) of the recording-power parameters for forming the 2T-mark is varied. The Pw (2-1), under which the best quality is obtained, decreases with an increase in the pulse width Ttop.

Figure 14:
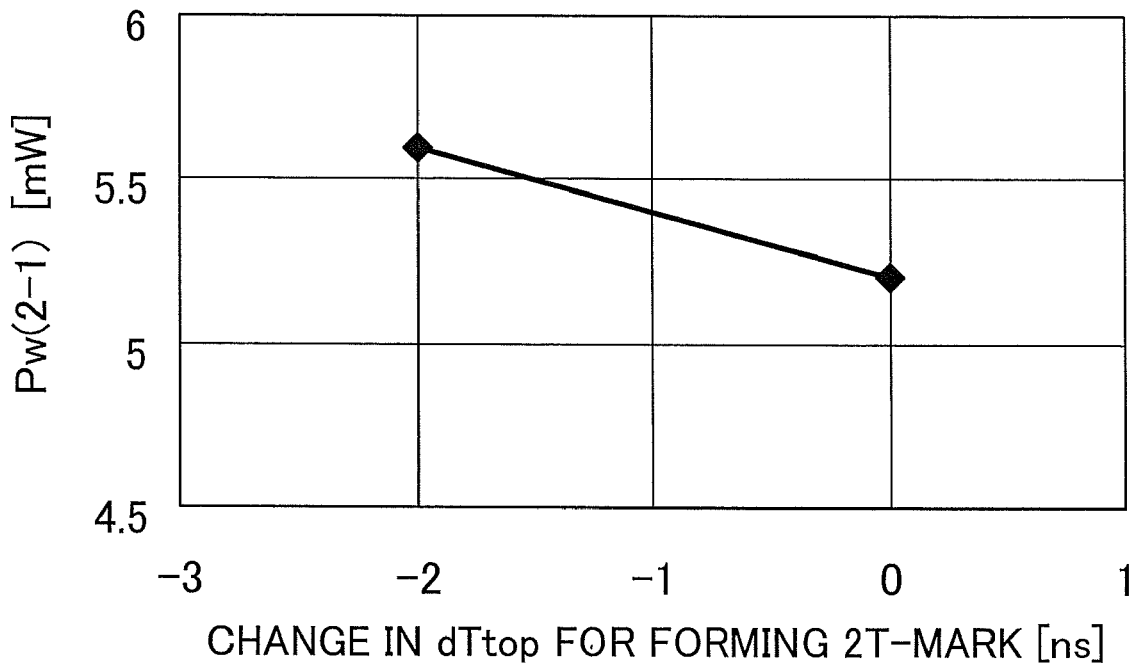
FIG. 14 is a graph indicating a result of jitter measurement in the optical recording condition setting method.

FIG. 14 is a graph indicating a change in the recording power under which the best quality of reproduced signal reproduced from the 2T-mark, in a case where a starting point dTop of the pulse at the trailing section of the 2T-mark is moved forward and backward, and only the Pw (2-1) of the recording-power parameters for forming the 2T-mark is varied. The Pw (2-1), under which the best quality is obtained, decreases as the starting point dTop moves forward, i.e. in the plus direction of the graph.

Figure 15:
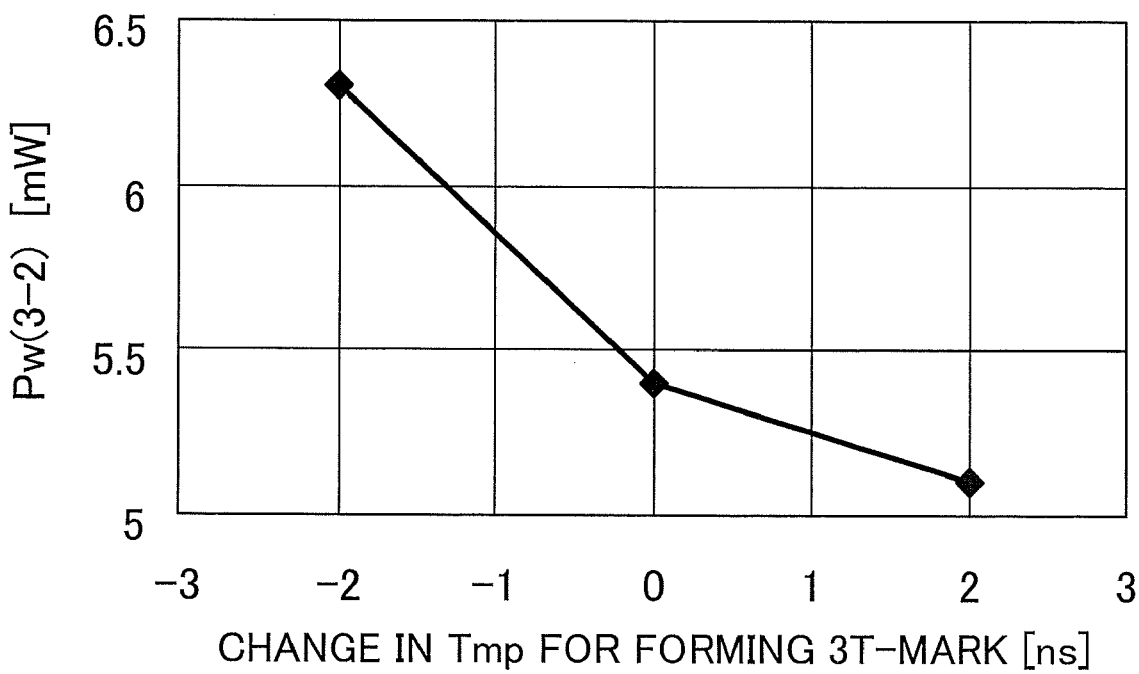
FIG. 15 is a graph indicating a result of jitter measurement in the optical recording condition setting method.

FIG. 15 is a graph indicating the change in the recording power under which the best quality of the reproduced signal reproduced from a 3T-mark, in a case where a pulse width Tmp of a pulse at an intermediate section of the 3T-mark is changed forward and backward, and only Pw (3-2) of the recording-power parameters for forming the 3T-mark is varied. The Pw (3-2), under which the best quality is obtained, decreases with an increase in the pulse width Tmp.

From these foregoing results, it is obvious that the recording-power parameters, under which the best quality of the reproduced signal is obtained, are varied with a change in the recording-pulse parameters corresponding to the recording-power parameters. Thus, if values of the recording-power parameters seem to be excessively large after carrying out the test writing by varying the recording-power parameters during the test writing, it is possible to restrain the increase in the values of the recording-power parameters, by adjusting values of the recording-pulse parameters corresponding thereto.

For example, as shown in FIG. 12, in a case where the ending point dTe of the pulse at the trailing section of the 2T-mark is 2 ns, a value of the Pw (2-1) of the recording-power parameters with which the best quality of the reproduced signal is obtained is 5.6 mW. However, it is possible to bring the value of the Pw (2-1) down to 5.2 mW by merely setting the ending point dTe at ±0 ns. On the other hand, it is also possible to prevent an excessive decrease in the recording-power parameters by varying the values of the corresponding recording-pulse parameters. For example, as shown in FIG. 12, in a case where the ending point dTe of the pulse at the trailing section of the 2T-mark is −2 ns, the value of the Pw (2-1) of the recording-power parameters with which the best quality of the reproduced signal is obtained is as small as 4.8 mW. However, it is possible to bring up the value of the Pw (2-1) to 5.2 mW by merely setting the ending point dTe at ±0 (zero) ns.

More specifically, ranges of the respective recording-power parameters for use in the test writing are preliminarily determined. If the recording-power parameters within the ranges do not result in the best quality of the reproduced signals, the recording-power parameters may be adjusted by varying the corresponding recording-pulse parameters, and the test writing is carried out with the adjusted recording-power parameters. At this point, the ranges of the respective recording-power parameters for use in the test writing may be determined based on values of the recording-power parameters resulting in the best quality of the reproduced signals, when a predetermined amount of change is added to the corresponding recording-pulse parameters.

For example, as shown in FIG. 12, in a case where −2 ns is added to the ending point dTe of the pulse at the trailing section, the most appropriate Pw (2-1) of the recording-power parameters is 4.8 mW. In the meanwhile, in the case where +2 ns is added, the most appropriate Pw (2-1) of the recording-power parameters is 5.6 mW. Accordingly, if the dTe of the recording-pulse parameters is ±0 (zero) ns, the range of the variation of the Pw (2-1) of the recording-power parameters is between 4.8 and 5.6 mW.

Figure 16:
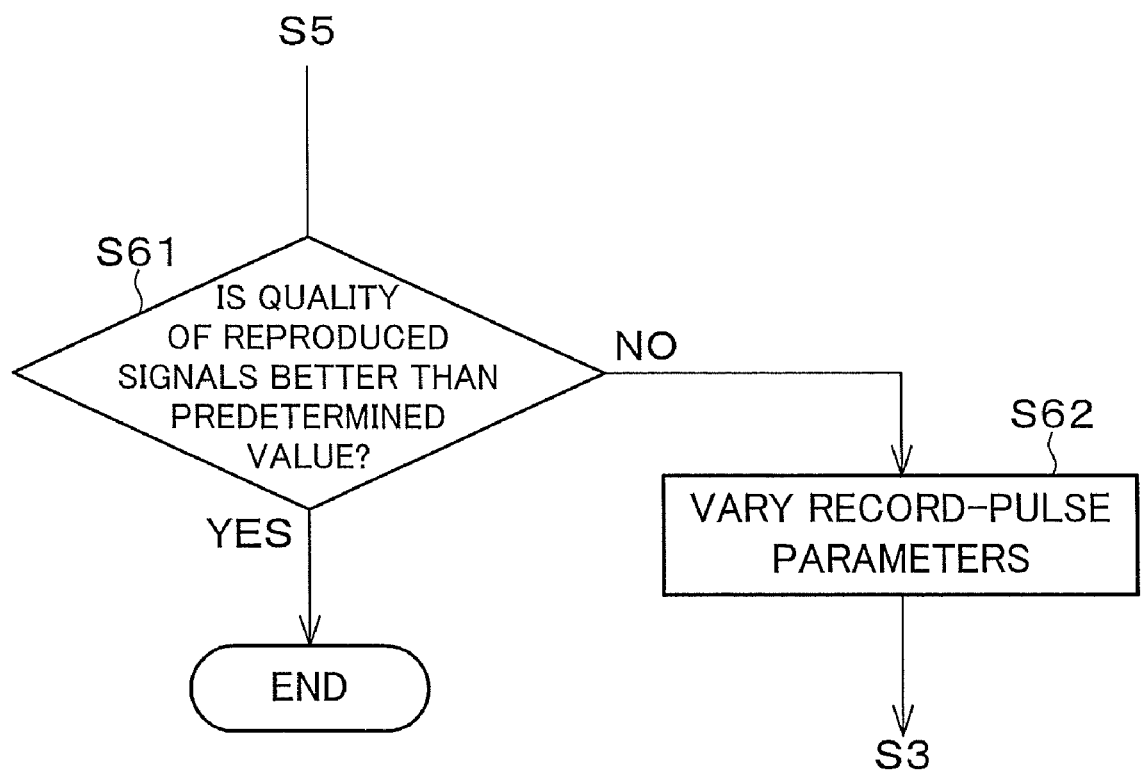
FIG. 16 is a flow-chart indicating yet further embodiment of the optical recording condition setting method in accordance with the present invention.

The following describes the optical recording condition setting method of the present embodiment which is executed in an optical disk system 1, with reference to a flow-chart shown in FIG. 16. It should be noted that the flow-chart is in succession of the step S5 described in the foregoing embodiment 1 (See FIG. 6). The steps up to the step S5 are as described in the foregoing embodiment 1, and the descriptions of those the steps are omitted.

As shown in FIG. 16, after carrying out the steps up to S5 (See FIG. 6) described in the foregoing embodiment 1 in the optical disk system 1, the quality of the reproduced signal is evaluated (S61). Note that the recording-power parameters are changed within a predetermined range in the step S3. In the step S61, if the quality of the reproduced signals is better than a predetermined quality of the reproduced signals, the setting of the recording-power parameters is ended. On the contrary, if the quality of the reproduced signals is not good enough, the recording-power parameters corresponding to recording-pulse parameters are varied so as to be set (S62). Then, the process goes back to the S3 (See FIG. 6) described in the foregoing embodiment 1.

As described, the recording-power parameters and recording-pulse parameters are more accurately set by (i) carrying out the test writing after setting the recording-power parameters, and (ii) varying the recording-pulse parameters corresponding to the recording-power parameters to be varied, based on a result of the test writing.

It should be noted that the present invention is not limited to the present embodiment, and may be varied in many ways within a scope of the present invention. For example, the recording conditions are preferably set at least once for each of tracks. However, this is not necessary, and the setting of the recording-conditions may be carried out for each group including plural tracks.

Further, the optical disk system 1 includes (i) a CPU (Central Processing Unit) serving as calculating means for executing a command from a program (control program, recording condition setting program) for realizing respective functions of a control section 20, (ii) a ROM (Read Only Memory) serving as storing means in which the program is stored, (iii) a RAM (Random Access Memory) serving as another storing means for running the program, and (iv) a storing device (storage medium) (not shown) or the like (e.g. a memory) serving as yet another storing means for storing the program and various kinds of data.

The object of the present invention is also achieved by (i) providing, to the optical disk system 1, a recording medium which is a software storing therein the controlling program for realizing the foregoing functions, the recording medium whose program code is readable by a computer, and (ii) reading out the program code and executing it by using the computer, the CPU, or an MPU. In this case, since the foregoing functions are realized by the program code itself being read out from the recording medium, the present invention is applied to the recording medium storing therein the program code.

Further, a control program of the present embodiment is for operating the optical disk system 1, and for causing the computer to function as each of the foregoing means.

Thus, it is possible to provide the control program which causes the computer to function as each of the foregoing means.

Further, a computer-readable recording medium of the present embodiment stores therein the control program.

Thus, it is possible to provide a computer-readable recording medium which stores therein the control program.

The present invention is not limited to the embodiments above, but may be altered within the scope of the claims. An embodiment based on a proper combination of technical means disclosed in different embodiments is encompassed in the technical scope of the present invention.

Further, the present invention may be adapted as follows.

Namely, the method for setting the optical recording conditions may include the step of (II) determining at least one recording-power parameter including the shortest-mark-recording-power parameter for obtaining the good quality of the reproduced signal, by performing the test writing of the test pattern with respect to the optical recording medium under various settings of the at least one recording-power parameter.

The optical recording/reproducing device of the present invention may include (i) second test writing means for carrying out a test writing under various settings of at least one recording-power parameter including the shortest-mark-recording-power parameter, for use in forming the shortest record-mark and/or a non-shortest record-mark; and (ii) recording-power determining means for reproducing the test pattern used in the test writing carried out by the second test writing means, and for determining the at least one recording-power parameter for use in forming the shortest record-mark and/or the non-shortest record-mark.

As described, the at least one recording-power parameter is determined for each of record-mark lengths. Then, the at least one recording-power parameter for forming the shortest record-mark is so adjusted as to obtain the good quality of the reproduced signals. As a result, it is possible to optimize the recording-power parameters for each of the record-mark lengths.

The method of the present invention for setting the optical recording conditions may adapted so that the step of determining the shortest-mark-recording-power parameter is carried out after the step (II).

The optical recording/reproducing device of the present invention may be adapted so that the first test writing means varies the shortest-mark-recording-power parameter which is determined by using the recording-power determining means through the test writing being performed by the first test writing means with respect to the optical recording medium.

With the foregoing invention, it is possible to select the recording-pulse parameter for obtaining the good quality of the reproduced signals, with the recording-power parameter for forming the other record-mark being fixed.

As a result, it is possible to provide (i) a method for setting the optical recording conditions, in which effects from uneven properties of a rewritable or recordable optical disk and an optical recording/reproducing device are reduced, and (ii) an optical recording/reproducing device which executes the method.

The method of the present invention for setting the optical recording conditions may adapted so that the step of determining the shortest-mark-recording-power parameter is carried out prior to the step (II).

The optical recording/reproducing device of the present invention may be adapted so that, after the at least one recording-power parameter that results in the good quality of the reproduced signals is determined, the second test writing means carries out the test writing under various settings of the at least one recording-power parameter for use in forming the shortest record-mark and/or the non-shortest record-mark.

As described, first, the recording-power parameters for forming the shortest record-mark are determined, and then the recording-power parameters that result in the good quality of the reproduced signals are determined for each of the record-mark lengths. As a result, it becomes possible to optimize parameters for each of the record-mark lengths.

This is advantageous in a case where, for example, the quality of the overall reproduced signals is not good, even though the recording-power parameters are optimized after determining the recording-power parameters for forming the shortest record-mark.

As a result it is possible to provide (i) a method for setting the optical recording conditions, in which effects from uneven properties of a rewritable or recordable optical disk and an optical recording/reproducing device are reduced, and (ii) an optical recording/reproducing device which executes the method.

The method of the present invention for setting the optical recording conditions may include the steps of (III) determining a recording-pulse parameter for use in forming the shortest record-mark and/or a non-shortest record-mark, for obtaining the good quality of the reproduced signal, by performing the test writing under various settings of the recording-pulse parameter.

The optical recording/reproducing device of the present invention may include (i) third test writing means for carrying out the test writing under various settings of recording-pulse parameter; and (ii) recording-pulse determining means for reproducing the test pattern used in the test writing carried out by the third test writing means, and for determining the recording-pulse parameter for use in forming the shortest record-mark and/or a non-shortest record-mark.

It should be noted that, the recording-pulse parameter is a parameter of a recording pulse, such as a starting point dTop of a pulse at a leading section, a pulse width Ttop of the pulse at the leading section, an ending point dTe of a pulse at a trailing section, and a pulse width Tmp of a pulse at an intermediate section (See FIG. 4($b$)). The recording-pulse parameters may be only a single parameter or a plurality of parameters.

In the foregoing invention, first, the recording-pulse parameter under which the good quality of the reproduced signals is obtained, is determined for each of the record-mark lengths, and then the recording-power parameters for forming the shortest record-mark is determined. As a result, parameters for the recording pulse itself are also optimized.

The method of the present invention for setting the optical recording conditions may be adapted so that the step of determining the shortest-mark-recording-power parameter is carried out after the step (III).

The optical recording/reproducing device of the present invention may be adapted so that, after the recording-pulse parameter is determined by the recording pulse determining means, the first test writing means performs the test writing with respect to the optical recording medium under the various settings of the shortest-mark-recording-power parameter for use in forming the shortest record-mark.

With the foregoing inventions, it is possible to determine the recording-power parameters for forming the shortest record-mark, with the recording-pulse parameter that results in the good quality of the reproduced signals being fixed. As a result it is possible to provide (i) a method for setting the optical recording conditions, in which effects from uneven properties of a rewritable or recordable optical disk and an optical recording/reproducing device are reduced, and (ii) an optical recording/reproducing device which executes the method.

The method of the present invention for setting the optical recording conditions may be adapted so that the step of determining the shortest-mark-recording-power parameter is carried out prior to the step (III).

The optical recording/reproducing device of the present invention may be adapted so that, after determining at least one recording-power parameter including the shortest-mark-recording-power parameter, for obtaining the good quality of the reproduced signals, the third test writing means performs the test writing under the various settings of the recording-pulse parameter for use in forming the shortest record-mark and/or the non-shortest record-mark.

In the foregoing invention, first, the at least one recording-power parameters for forming the shortest record-mark is determined, then the recording-pulse parameter under which the good quality of the reproduced signals is obtained is determined for each of the record-mark lengths. Thus, it becomes possible to optimize the parameters for each of the record-mark lengths.

As a result it is possible to provide (i) a method for setting the optical recording conditions, in which effects from uneven properties of a rewritable or recordable optical disk and an optical recording/reproducing device are reduced, and (ii) an optical recording/reproducing device which executes the method.

The method of the present invention for setting the optical recording conditions may include the step of (IV) determining at least one recording-power parameter including the shortest-mark-recording-power parameter, for obtaining the good quality of the reproduced signal, by (a) carrying out the test writing of the test pattern with respect to the optical recording medium under various settings of the at least one recording-power parameter, in order of the length from a shorter length to a longer length, and (b) reproducing the test pattern recorded in the test writing, the step (IV) being carried out at least once after the step (III).

The optical recording/reproducing device of the present invention may be adapted so that, the selecting means determines at least one recording-power parameter including the shortest-mark-recording-power parameter at least once after determining the shortest-mark-recording-power parameter, by (i) carrying out the test writing of the test pattern with respect to the optical recording medium under various settings of the at least one recording-power parameter, in order of the length from a shorter length to a longer length, and (iii) reproducing the test pattern recorded in the test writing.

In the foregoing invention, the selecting means determines at least one recording-power parameter including the shortest-mark-recording-power parameter, at least once after determining the shortest-mark-recording-power parameter, by (i) carrying out the test writing of the test pattern with respect to the optical recording medium under various settings of the at least one recording-power parameter, in order of the length from a shorter length to a longer length, and (iii) reproducing the test pattern recorded in the test writing. Accordingly, not only is it that the shortest-mark-recording-power parameters are determined for obtaining good quality reproduced signals reproduced from the shortest record-marks, but also that the other recording-power parameters are determined in order of length, for example, from 3T-mark, 4T-mark, and so on. This realizes the good quality of the reproduced signals reproduced from the other record-marks. The foregoing description mentions that the at least one recording-power parameter is determined at least once. It should be noted that this description means that, for example, in a case where 2T-mark to the 8T-mark are to be formed, the recording-power parameters for forming the 8T-mark may not be determined, and the process may end after determining the recording-power parameters for forming a 7T-mark.

Further, the recording-power parameter is varied in order of record-mark length from a shorter length to a longer length. However, it is not necessary to carry out the varying of the recording-power parameter with respect to all of the record-mark lengths, as long as the recording-power parameter to be varied next form the record-mark having a length longer than the record-mark formed under the recording-power parameter that has been previously varied. For example, after the recording-power parameter for forming the 3T-mark, it is possible to vary the recording-power parameter for forming a 5T-mark, instead of varying the recording-power parameter for forming the 4T-mark.

As a result, with respect to all of the record-mark lengths, it is possible to (i) reduce effects from uneven properties of a rewritable or recordable optical disk and uneven properties of the optical disk system 1, (ii) more accurately optimize the recording pulse conditions, and (iii) more efficiently carry out the setting of the recording-power parameter for obtaining the good quality of the reproduced signals.

As a result it is possible to provide (i) a method for setting the optical recording conditions, in which effects from uneven properties of a rewritable or recordable optical disk and an optical recording/reproducing device are reduced, and (ii) an optical recording/reproducing device which executes the method.

The method of the present invention for setting the optical recording conditions may include the step of (V) varying the recording-pulse parameter, the step (V) being performed prior to the step (IV).

In the foregoing invention, the recording-pulse parameter is varied before the shortest-mark-recording-power parameter is determined, as such, after the recording-pulse parameter is optimized, it is possible to select the shortest-mark-recording-power parameter under which the good quality of the reproduced signal is obtained.

Further, the method for setting the optical recording conditions in the optical recording/reproducing device may be adapted so that, a varying range of the at least one recording-power parameter for use in the test writing is determined based on a value of the at least one recording-power parameter resulting in the good quality of the reproduced signal when the recording-pulse parameter corresponding to the at least one recording-power parameter is varied by a predetermined amount.

With the foregoing invention, since the varying ranges of the recording-power parameter for use in the test writing may be determined based on the values of the recording-power parameter resulting in the good quality of the reproduced signals, when the recording-pulse parameter corresponding to the at least one recording-power parameter is varied by the predetermined amount, it is possible to prevent an excessive increase or decrease in the recording-power parameter, and to realize more accurate settings of the recording-power parameter and the recording-pulse parameter.

The method of the present invention for setting the optical recording conditions may be adapted so that a quality of the reproduced signal is indicated by a value of jitter.

The method of the present invention for setting the optical recording conditions may be adapted so that a quality of the reproduced signal is indicated by an error rate.

The both error rate and the jitter value are often used for indicating power margin regulation for the optical disk 10, and it is possible to indicate a quality of the recording based on a deviation of the error rate or the jitter value from a threshold value of the power margin regulation.

In a case of indicating the quality of the reproduced signals by using the jitter value, the quality of the reproduced signals is improved by reducing the jitter in the pulse, i.e. reducing an amount of distortion in the pulse.

Further, in a case of indicating the quality of the reproduced signals by using the error rate, the quality of the reproduced signals is improved by improving the error rate.

The method of the present invention for setting the optical recording conditions may be adapted so that the optical recording medium stores in advance, recording conditions including shortest-mark-recording-power parameter and the recording-pulse parameter. These recording conditions are read out, and are adjusted for use in the test writing.

In the foregoing invention, the optical recording medium stores in advance the recording conditions including the shortest-mark-recording-power parameter and the recording-pulse parameter. These recording conditions are read out, and are adjusted for use in the test writing. Therefore, it is possible to obtain the recording conditions for use in the test writing from the recording conditions stored in the optical recording medium.

In order to solve the problems previously described, a control program of the present invention may be the control program for operating the foregoing optical recording/reproducing device, the control program causing the computer of the optical recording/reproducing device to function as each of the foregoing means.

With the foregoing invention, it is possible to provide a control program that causes the computer to function as each of the foregoing means.

Further, in order to solve the problems previously described, a computer-readable recording medium includes the foregoing control program.

With the foregoing invention, it is possible to provide the computer-readable recording medium storing therein the foregoing control program.

Conventionally, in a case where properties for forming the record mark are different depending on the record-mark lengths, adding a predetermined change uniformly may not result in appropriate formations of the record-marks of the respective lengths.

However, in the present embodiment, the shortest-mark-recording-power parameter for use in forming the shortest record-mark is varied, in order to determine the recording-power parameters for improving the quality of the reproduced signals.

More specifically, shorter the length of the record-mark is, less a number of the recording-power parameters to be varied becomes, as such, it becomes difficult to set the recording-power parameters that result in the good quality of the reproduced signals. Further, shorter the length of the record mark is, more frequently is the record mark used within a data set; therefore the record-mark having a shorter length has a larger influence to an overall quality of forming the record marks. This requires that the recording-power parameters for use in forming the shorter record-mark be more delicately adjusted.

Accordingly, the quality of the overall reproduced signals is most effectively improved by selecting the shortest-mark-recording-power parameter under which the good quality of the reproduced signal is obtained, the shortest-mark-recording-power parameter for use in forming the shortest record-mark. Thus, by selecting such setting of the shortest-record-mark-recording-power parameters that the quality of the reproduced signals becomes the best, it is possible to reduce effects of the uneven properties of the rewritable or recordable optical disk and the optical disk recording/reproducing system to the overall quality of the reproduced signals Further, in a conventional method, a predetermined change is added to one of combinations of space length and the record-mark length. In the conventional method, however, the record-marks having a uniform length are improved only partially. This resulted in an insufficient improvement in the quality of the reproduced signals reproduced from the overall spaces and the record marks. The present invention also solves this problem, by taking into account the quality of the reproduced signals reproduced from all of the record-marks.

As a result, it is possible to provide (i) a method and a control program therefor, for setting the optical recording conditions, in which effects from uneven properties of a rewritable or recordable optical disk and an optical recording/reproducing device are reduced, and (iii) a recording medium and an optical recording/reproducing device which executes the method.

The present invention is applicable to an optical recording condition setting method and a control program therefor, in which (i) recording conditions are set by (a) reading out setting information for determining the recording conditions recorded in a specific region of an optical recording medium such as an optical disk, or (b) outputting the setting information stored within a device, and (ii) correcting the recording conditions by carrying out recording and reproducing in a specific region for use in figuring out the recording conditions. The present invention is also applicable to an optical recording/reproducing device which executes the method, as well as to a recording medium storing therein the control program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A method for setting optical recording conditions in an optical recording/reproducing device, in which (i) information is recorded by modulating light in accordance with conditions adjusted for the information to be recorded and (ii) the information recorded is reproduced, the method comprising the steps of:

(I) determining a shortest-mark-recording-power parameter for use in forming a shortest record-mark, for obtaining a good quality of a reproduced signal, by (a) carrying out a test writing of a test pattern with respect to an optical recording medium under various settings of the shortest-mark-recording-power parameter, and (b) reproducing the test pattern recorded in the test writing; and (II) determining each recording-pulse parameter for use in forming all record-marks, for obtaining the good quality of the reproduced signal, by performing the test writing under various settings of the each recording-pulse parameter, the settings being uniformly varied in the each recording-pulse parameter, wherein:

the step (I) is carried out after the step (II); and at least the shortest-mark-recording-power parameter is set independently of a recording-power parameter for a record-mark of other length.

2. The method as set forth in claim 1, comprising the step of:

(III) determining at least one recording-power parameter including the shortest-mark-recording-power parameter for obtaining the good quality of the reproduced signal, by performing the test writing of the test pattern with respect to the optical recording medium under various settings of the at least one recording-power parameter.

3. The method as set forth in claim 2, wherein the step (I) is carried out after the step (III).

4. The method as set forth in claim 2, wherein the step (I) is carried out prior to the step (III).

5. The method as set forth in claim 1, further comprising the step of:
(IV) determining at least one recording-power parameter including the shortest-mark-recording-power parameter, for obtaining the good quality of the reproduced signal, by (a) carrying out the test writing of the test pattern with respect to the optical recording medium under various settings of the at least one recording-power parameter, in order of the length from a shorter length to a longer length, and (b) reproducing the test pattern recorded in the test writing, the step (IV) being carried out at least once after the step (II).

6. The method as set forth in claim 5, further comprising the step of:
(V) varying the recording-pulse parameter, the step (V) being performed prior to the step (IV).

7. The method as set forth in claim 6, wherein:
a varying range of the at least one recording-power parameter for use in the test writing is determined based on a value of the at least one recording-power parameter resulting in the good quality of the reproduced signal when the recording-pulse parameter corresponding to the at least one recording-power parameter is varied by a predetermined amount.

8. The method as set forth in claim 1, wherein a quality of the reproduced signal is indicated by a value of jitter.

9. The method as set forth in claim 1, wherein a quality of the reproduced signal is indicated by an error rate.

10. The method as set forth in claim 1, wherein:
recording conditions are stored in the optical recording medium in advance, the recording conditions including at least one recording-power parameter including the shortest-mark-recording-power parameter, and the recording-pulse parameter; and
the recording conditions are read out from the optical medium and are adjusted for use in the test writing.

11. An optical recording/reproducing device in which (i) information is recorded by modulating light in accordance with conditions adjusted for the information to be recorded and (ii) the information recorded is reproduced, the optical recording/reproducing device comprising:
first test writing means for carrying out a test writing with respect to an optical recording medium under various settings of shortest-mark-recording-power parameter for use in forming a shortest record-mark;
reproduced-signal-evaluating means for reproducing a test pattern recorded in the test writing, and for evaluating quality of the reproduced signal;
selecting means for selecting the shortest-mark-recording-power parameter that results in a good quality of the reproduced signal;
second test writing means for carrying out the test writing under various settings of each recording-pulse parameter, the settings being uniformly varied in the each recording-pulse parameter; and
recording-pulse determining means for reproducing the test pattern used in the test writing carried out by the second test writing means, and for determining the each recording-pulse parameter for use in forming all record-marks, wherein:
after the recording-pulse parameter is determined by the recording pulse determining means, the first test writing means performs the test writing with respect to the optical recording medium under the various settings of the shortest-mark-recording-power parameter for use in forming the shortest record-mark; and
at least the shortest-mark-recording-power parameter is set independently of a recording-power parameter for a record-mark of other length.

12. The optical recording/reproducing device as set forth in claim 11, wherein:
the first test writing means is a laser drive circuit;
the reproduced-signal-evaluating means includes a detector for detecting the reproduced signal, and a microprocessor for evaluating the quality of the reproduced signal; and
the selecting means is a comparator.

13. The optical recording/reproducing device as set forth in claim 11, further comprising:
third test writing means for carrying out a test writing under various settings of at least one recording-power parameter including the shortest-mark-recording-power parameter, for use in forming the shortest record-mark and/or a non-shortest record-mark; and
recording-power determining means for reproducing the test pattern used in the test writing carried out by the third test writing means, and for determining the at least one recording-power parameter for use in forming the shortest record-mark and/or the non-shortest record-mark.

14. The optical recording/reproducing device as set forth in claim 13, wherein:
the third test writing means is a laser drive circuit; and
the recording-power determining means is a microprocessor.

15. The optical recording/reproducing device as set forth in claim 13, wherein:
the first test writing means varies the shortest-mark-recording-power parameter, which is determined by using the recording-power determining means through the test writing being performed by the first test writing means with respect to the optical recording medium.

16. The optical recording/reproducing device as set forth in claim 13, wherein:
after the at least one recording-power parameter that results in the good quality of the reproduced signals is determined, the third test writing means carries out the test writing under various settings of the at least one recording-power parameter for use in forming the shortest record-mark and/or the non-shortest record-mark.

17. The optical recording/reproducing device as set forth in claim 11, wherein:
the second test writing means is a laser drive circuit; and
the recording-pulse determining means is a microprocessor.

18. The optical recording/reproducing device as set forth in claim 11, wherein:
the selecting means determines at least one recording-power parameter including the shortest-mark-recording-power parameter, at least once after determining the shortest-mark-recording-power parameter, by carrying out the test writing of the test pattern with respect to the optical recording medium under various settings of the at least one recording-power parameter, in order of the length from a shorter length to a longer length, and reproducing the test pattern recorded in the test writing.

19. A non-transitory computer-readable recording medium, for use in an optical recording/reproducing device in which (i) information is recorded by modulating light in accordance with conditions adjusted for the information to be recorded and (ii) the information recorded is reproduced, the computer-readable recording medium containing:

a control program which causes the optical recording/reproducing device to function as:

first test writing means for carrying out a test writing with respect to an optical recording medium under various settings of shortest-mark-recording-power parameter for use in forming a shortest record-mark;

reproduced-signal-evaluating means for evaluating a quality of a reproduced signal reproduced from a test pattern used in the test writing carried out by the first test writing means; and selecting means for selecting the shortest-mark-recording-power parameter that result in a good quality of reproduced signals;

second test writing means for carrying out the test writing under various settings of each recording-pulse parameter, the settings being uniformly varied in the each recording-pulse parameter; and recording-pulse determining means for reproducing the test pattern used in the test writing carried out by the second test writing means, and for determining the each recording-pulse parameter for use in forming all record-marks, wherein:

after the recording-pulse parameter is determined by the recording pulse determining means, the first test writing means performs the test writing with respect to the optical recording medium under the various settings of the shortest-mark-recording-power parameter for use in forming the shortest record-mark; and at least the shortest-mark-recording-power parameter is set independently of a recording-power parameter for a record-mark of other length.

* * * * *